United States Patent
Kourtakis et al.

(10) Patent No.: US 9,093,710 B2
(45) Date of Patent: Jul. 28, 2015

(54) COMPOSITIONS, LAYERINGS, ELECTRODES AND METHODS FOR MAKING

(71) Applicant: E I DU PONT DE NEMOURS AND COMPANY, Wilmington, DE (US)

(72) Inventors: Kostantinos Kourtakis, Media, PA (US); Samuel David Arthur, Wilmington, DE (US); Brent Wise, Waverly, TN (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/743,826

(22) Filed: Jan. 17, 2013

(65) Prior Publication Data

US 2013/0183549 A1 Jul. 18, 2013

Related U.S. Application Data

(60) Provisional application No. 61/587,849, filed on Jan. 18, 2012.

(51) Int. Cl.
*H01M 10/44* (2006.01)
*H01M 4/62* (2006.01)
(Continued)

(52) U.S. Cl.
CPC ............ *H01M 4/622* (2013.01); *H01M 2/1653* (2013.01); *H01M 2/1686* (2013.01); *H01M 4/134* (2013.01); *H01M 4/366* (2013.01); *H01M 4/62* (2013.01); *H01M 10/02* (2013.01);
(Continued)

(58) Field of Classification Search
CPC .............................. H01M 10/04; H01M 4/622

USPC .................................................. 429/50, 218.1
See application file for complete search history.

(56) References Cited

U.S. PATENT DOCUMENTS 5,003,012 A 3/1991 Chamberlain et al.
5,470,448 A 11/1995 Molter et al.
(Continued)

FOREIGN PATENT DOCUMENTS

JP        11339808 A    12/1999
KR   1020040023882 A     3/2004
(Continued)

OTHER PUBLICATIONS

Naoi et al., A New Energey Storage Material: Organosulfur Compounds Based on Multiple Sulfur—Sulfur Bonds, J. Electrochem. Soc., vol. 144, No. 6 (1997), pp. L170-L172.
(Continued)

*Primary Examiner* — Jane Rhee

(57) ABSTRACT

There is a cell comprising an article comprising a hydrocarbon ionomer. The article may be any element in the cell, such as an interior wall, or a modification to an element, such as a film, a membrane, and a coating. The hydrocarbon ionomer is any polymer with ionic functionality, such as a polymeric (methacrylate) neutralized with lithium, and not containing halogen or halogen-containing substituents. The hydrocarbon ionomer may also be included in a composition within an element of the cell, such as a porous separator. The cell also comprises a positive electrode including sulfur compound, a negative electrode, a circuit coupling the positive electrode with the negative electrode, an electrolyte medium and an interior wall of the cell. In addition, there are methods of making the cell and methods of using the cell.

20 Claims, 3 Drawing Sheets

(51) Int. Cl.
*H01M 10/04* (2006.01)
*H01M 10/02* (2006.01)
*H01M 2/16* (2006.01)
*H01M 4/134* (2010.01)
*H01M 4/36* (2006.01)
*H01M 10/052* (2010.01)
*H01M 10/058* (2010.01)
*H01M 4/38* (2006.01)

(52) U.S. Cl.
CPC ............ *H01M10/04* (2013.01); *H01M 10/052* (2013.01); *H01M 10/058* (2013.01); *H01M 4/38* (2013.01); *H01M 4/382* (2013.01); *Y02E 60/122* (2013.01); *Y02T 10/7011* (2013.01); *Y10T 29/49108* (2015.01)

(56) References Cited

U.S. PATENT DOCUMENTS

| | | | |
|---|---|---|---|
| 6,518,365 | B1 | 2/2003 | Powell et al. |
| 6,576,365 | B1 | 6/2003 | Meitav et al. |
| 2006/0177732 | A1 | 8/2006 | Visco et al. |
| 2010/0035124 | A1 | 2/2010 | Thompson et al. |
| 2010/0035162 | A1 | 2/2010 | Chiga et al. |
| 2010/0068622 | A1 | 3/2010 | Wang et al. |
| 2010/0075226 | A1 | 3/2010 | Pham et al. |
| 2011/0052998 | A1 | 3/2011 | Liang et al. |
| 2011/0081594 | A1 | 4/2011 | Han et al. |
| 2012/0119158 | A1 | 5/2012 | Barchasz et al. |
| 2013/0177804 | A1* | 7/2013 | Verbrugge et al. ............ 429/211 |
| 2013/0181676 | A1 | 7/2013 | Kourtakis et al. |
| 2015/0024268 | A1 | 1/2015 | Arthur et al. |

FOREIGN PATENT DOCUMENTS

| | | |
|---|---|---|
| WO | 2010148218 A1 | 12/2010 |
| WO | 2011010010 A1 | 1/2011 |
| WO | 2013126864 A1 | 8/2013 |

OTHER PUBLICATIONS

Brunauer et al., Adsorption of Gasses in Multimolecular Layers, J. Amer. Chem. Soc., vol. 60 (1938), pp. 309-319.
Barret et al., The Determination of Pore Volume and Carea Distributions in Porous Substances, J. Amer. Chem. Soc., vol. 73 (1951), pp. 373-380.
International Search Report, Corresponding PCT International Patent Application No. PCT/US2013/02056, Mailed Apr. 29, 2013.
International Search Report, Corresponding PCT International Patent Appication No. PCT/US2013/022056, Mailed Apr. 29, 2013.
International Preliminary Report on Patentability, Corresponding PCT International Patent Application No. PCT/US2013/022056, Mailed Jul. 31, 2014.
International Search Report, PCT International Patent Application No. PCT/US2013/027556, Mailed Jun. 21, 2013.
International Preliminary Report on Patentability, PCT International Application No. PCT/US2013/027556, Mailed Sep. 4, 2014.
International Search Report, PCT International Patent Application No. PCT/US2013/027551, Mailed Jun. 18, 2013.
International Preliminary Report on Patentability, PCT International Patent Application No. PCT/US2013/027551, Mailed Sep. 4, 2014.

* cited by examiner

COMPOSITIONS, LAYERINGS, ELECTRODES AND METHODS FOR MAKING

CROSS-REFERENCE TO RELATED APPLICATIONS

This application claims priority on and the benefit of the filing date of U.S. Provisional Application Nos. 61/587,849, filed on Jan. 18, 2012, and U.S. Provisional Application Nos. 61/602,180, filed on Feb. 23, 2012, the entirety of which is herein incorporated by reference.

BACKGROUND OF THE INVENTION

There is significant interest in lithium sulfur (i.e., "Li—S") batteries as potential portable power sources for their applicability in different areas. These areas include emerging areas, such as electrically powered automobiles and portable electronic devices, and traditional areas, such as car ignition batteries. Li—S batteries offer great promise in terms of cost, safety and capacity, especially compared with lithium ion battery technologies not based on sulfur. For example, elemental sulfur is often used as a source of electroactive sulfur in a Li—S cell of a Li—S battery. The theoretical charge capacity associated with electroactive sulfur in a Li—S cell based on elemental sulfur is about 1,672 mAh/g S. In comparison, a theoretical charge capacity in a lithium ion battery based on a metal oxide is often less than 250 mAh/g metal oxide. For example, the theoretical charge capacity in a lithium ion battery based on the metal oxide species $LiFePO_4$ is 176 mAh/g.

A Li—S battery includes one or more electrochemical voltaic Li—S cells which derive electrical energy from chemical reactions occurring in the cells. A cell includes at least one positive electrode. When a new positive electrode is initially incorporated into a Li—S cell, the electrode includes an amount of sulfur compound incorporated within its structure. The sulfur compound includes potentially electroactive sulfur which can be utilized in operating the cell. A negative electrode in a Li—S cell commonly includes lithium metal. In general, the cell includes a cell solution with one or more solvents and electrolytes. The cell also includes one or more porous separators for separating and electrically isolating the positive electrode from the negative electrode, but permitting diffusion to occur between them in the cell solution. Generally, the positive electrode is coupled to at least one negative electrode in the same cell. The coupling is commonly through a conductive metallic circuit.

Li—S cell configurations also include, but are not limited to, those having a negative electrode which initially does not include lithium metal, but includes another material. Examples of these materials are graphite, silicon-alloy and other metal alloys. Other Li—S cell configurations include those with a positive electrode incorporating a lithiated sulfur compound, such as lithium sulfide (i.e., $Li_2S$).

The sulfur chemistry in a Li—S cell involves a related series of sulfur compounds. During a discharge phase in a Li—S cell, lithium is oxidized to form lithium ions. At the same time larger or longer chain sulfur compounds in the cell, such as $S_8$ and $Li_2S_8$, are electrochemically reduced and converted to smaller or shorter chain sulfur compounds. In general, the reactions occurring during discharge may be represented by the following theoretical discharging sequence of the electrochemical reduction of elemental sulfur to form lithium polysulfides and lithium sulfide:

During a charge phase in a Li—S cell, a reverse process occurs. The lithium ions are drawn out of the cell solution. These ions may be plated out of the solution and back to a metallic lithium negative electrode. The reactions may be represented, generally, by the following theoretical charging sequence representing the electrooxidation of the various sulfides to elemental sulfur:

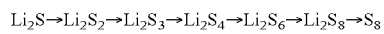

A common limitation of previously-developed Li—S cells and batteries is capacity degradation or capacity "fade". Capacity fade is associated with coulombic efficiency, the fraction or percentage of the electrical charge stored by charging that is recoverable during discharge. It is generally believed that capacity fade and coulombic efficiency are due, in part, to sulfur loss through the formation of certain soluble sulfur compounds which "shuttle" between electrodes in a Li—S cell and react to deposit on the surface of a negative electrode. It is believed that these deposited sulfides can obstruct and otherwise foul the surface of the negative electrode and may also result in sulfur loss from the total electroactive sulfur in the cell. The formation of anode-deposited sulfur compounds involves complex chemistry which is not completely understood.

In addition, low coulombic efficiency is another common limitation of Li—S cells and batteries. A low coulombic efficiency can be accompanied by a high self-discharge rate. It is believed that low coulombic efficiency is also a consequence, in part, of the formation of the soluble sulfur compounds which shuttle between electrodes during charge and discharge processes in a Li—S cell.

Some previously-developed Li—S cells and batteries have utilized high loadings of sulfur compound in their positive electrodes in attempting to address the drawbacks associated with capacity degradation and anode-deposited sulfur compounds. However, simply utilizing a higher loading of sulfur compound presents other difficulties, including a lack of adequate containment for the entire amount of sulfur compound in the high loading. Furthermore, positive electrodes formed using these compositions tend to crack or break. Another difficulty may be due, in part, to the insulating effect of the higher loading of sulfur compound. The insulating effect may contribute to difficulties in realizing the full capacity associated with all the potentially electroactive sulfur in the high loading of sulfur compound in a positive electrode of these previously-developed Li—S cell and batteries.

Conventionally, the lack of adequate containment for a high loading of sulfur compound has been addressed by utilizing higher amounts of binder in compositions incorporated into these positive electrodes. However, a positive electrode incorporating a high binder amount tends to have a lower sulfur utilization which, in turn, lowers the effective maximum discharge capacity of the Li—S cells with these electrodes.

Li—S cells and batteries are desirable based on the high theoretical capacities and high theoretical energy densities of the electroactive sulfur in their positive electrodes. However, attaining the full theoretical capacities and energy densities remains elusive. Furthermore, as mentioned above, the sulfide shuttling phenomena present in Li—S cells (i.e., the movement of polysulfides between the electrodes) can result in relatively low coulombic efficiencies for these electrochemical cells; and this is typically accompanied by undesirably high self-discharge rates. In addition, the concomitant limitations associated with capacity degradation, anode-deposited sulfur compounds and the poor conductivities intrinsic to sulfur compound itself, all of which are associated with previously-developed Li—S cells and batteries, limits the application and commercial acceptance of Li—S batteries as power sources.

Given the foregoing, what is needed are Li—S cells and batteries without the above-identified limitations of previously-developed Li—S cells and batteries.

BRIEF SUMMARY OF THE INVENTION

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing Li—S cells incorporating hydrocarbon ionomer articles, such as coatings, membranes, films and other articles incorporating hydrocarbon ionomer. Examples of various types and combinations of hydrocarbon ionomer articles which may be utilized are described below in the Detailed Description. The hydrocarbon ionomer articles provide Li—S cells with high coulombic efficiencies. In some embodiments, the hydrocarbon ionomer articles also provide Li—S cells with high maximum discharge capacities as well as high coulombic efficiencies, and without the above-identified limitations of previously-developed Li—S cells and batteries.

Hydrocarbon ionomer articles, according to the principles of the invention, provide Li—S cells with surprisingly high coulombic efficiencies and very high ratios of discharge to charge capacity. While not being bound by any particular theory, it is believed that the hydrocarbon ionomer in the hydrocarbon ionomer articles suppresses the shuttling of soluble sulfur compounds and their arrival at negative electrodes in the Li—S cells. This reduces capacity fade through sulfur loss in the cells. Furthermore, low sulfur utilization and high discharge capacity degradation are avoided in these cells.

These and other objects are accomplished by the hydrocarbon ionomer articles, methods for making such and methods for using such, in accordance with the principles of the invention.

According to a first principle of the invention, there is a cell. The cell comprises an article comprising a hydrocarbon ionomer. The cell may also comprise one or more of a positive electrode comprising sulfur compound, a negative electrode, a circuit coupling the positive electrode with the negative electrode, an electrolyte medium, and an interior wall of the cell. The article may be a porous separator. The porous separator may comprise one or more of polyimide, polyethylene and polypropylene. The hydrocarbon ionomer may be incorporated as a surface coating on a surface of the article in an amount of about 0.0001 to 100 mg/cm². The surface coating may be applied by a process comprising a calendaring step. The hydrocarbon ionomer may be a component in a polymer blend incorporated within the porous separator. The hydrocarbon ionomer may be located in a pore wall of a pore in the porous separator and exposed to electrolyte medium in a pore volume in the pore. The electrolyte medium may be a lithium-containing cell solution comprising solvent and electrolyte. The article may be a coating located on a surface of one or more of a porous substrate, the negative electrode, the circuit, and the interior wall of the cell. The coating may have characteristics of a film and be located on a surface of one or more of the circuit, and the interior wall of the cell. The coating may have characteristics of a membrane and be located on a surface of one or more at least one of the negative electrode, the circuit, and the interior wall of the cell. The article may be situated in the electrolyte medium and be one of a film, a membrane and a combination comprising characteristics of a film and a membrane in different parts of the combination. The hydrocarbon ionomer may comprise one or more ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized. The copolymer may comprise (meth)acrylic acid comonomer that is acrylic acid comonomer, methacrylic acid comonomer or a combination of acrylic acid and methacrylic acid comonomers. The poly(ethylene-co-(meth)acrylic) acid copolymer may incorporate the (meth) acrylic acid comonomer in an incorporation ratio of less than 20% per mole. The hydrocarbon ionomer may be a neutralized polyvinyl sulfonic acid. The hydrocarbon ionomer may be a neutralized sulfonated derivative of a poly(ether etherketone). The article may comprise a plurality of different types of hydrocarbon ionomer.

According to a second principle of the invention, there is a method for making a cell. The method comprises fabricating a plurality of components to form the cell. The plurality comprises an article comprising a hydrocarbon ionomer. The plurality may also comprise one or more of a positive electrode comprising sulfur compound, a negative electrode, a circuit coupling the positive electrode with the negative electrode, an electrolyte medium, and an interior wall of the cell. The article may be a porous separator. The porous separator may comprise one or more of polyimide, polyethylene and polypropylene. The hydrocarbon ionomer may be incorporated as a surface coating on a surface of the article in an amount of about 0.0001 to 100 mg/cm². The surface coating may be applied by a process comprising a calendaring step. The hydrocarbon ionomer may be a component in a polymer blend incorporated within the porous separator. The hydrocarbon ionomer may be located in a pore wall of a pore in the porous separator and exposed to electrolyte medium in a pore volume in the pore. The electrolyte medium may be a lithium-containing cell solution comprising solvent and electrolyte. The article may be a coating located on a surface of one or more of a porous substrate, the negative electrode, the circuit, and the interior wall of the cell. The coating may have characteristics of a film and be located on a surface of one or more of the circuit, and the interior wall of the cell. The coating may have characteristics of a membrane and be located on a surface of one or more at least one of the negative electrode, the circuit, and the interior wall of the cell. The article may be situated in the electrolyte medium and be one of a film, a membrane and a combination comprising characteristics of a film and a membrane in different parts of the combination. The hydrocarbon ionomer may comprise one or more ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized. The copolymer may comprise (meth)acrylic acid comonomer that is acrylic acid comonomer, methacrylic acid comonomer or a combination of acrylic acid and methacrylic acid comonomers. The poly(ethylene-co-(meth)acrylic) acid copolymer may incorporate the (meth) acrylic acid comonomer in an incorporation ratio of less than 20% per mole. The hydrocarbon ionomer may be a neutralized polyvinyl sulfonic acid. The hydrocarbon ionomer may be a neutralized sulfonated derivative of a poly(ether etherketone). The article may comprise a plurality of different types of hydrocarbon ionomer.

According to a third principle of the invention, there is a method for using a cell. The method comprises one or more steps from the plurality of steps comprising converting chemical energy stored in the cell into electrical energy, and converting electrical energy into chemical energy stored in the cell. The cell comprises an article comprising a hydrocarbon ionomer. The cell may also comprise one or more of a positive electrode comprising sulfur compound, a negative electrode, a circuit coupling the positive electrode with the negative electrode, an electrolyte medium, and an interior wall of the cell. The porous separator may comprise one or more of polyimide, polyethylene and polypropylene. The hydrocarbon ionomer may be incorporated as a surface coating on a surface of the article in an amount of about 0.0001 to 100 mg/cm$^2$. The surface coating may be applied by a process comprising a calendaring step. The hydrocarbon ionomer may be a component in a polymer blend incorporated within the porous separator. The hydrocarbon ionomer may be located in a pore wall of a pore in the porous separator and exposed to electrolyte medium in a pore volume in the pore. The electrolyte medium may be a lithium-containing cell solution comprising solvent and electrolyte. The article may be a coating located on a surface of one or more of a porous substrate, the negative electrode, the circuit, and the interior wall of the cell. The coating may have characteristics of a film and be located on a surface of one or more of the circuit, and the interior wall of the cell. The coating may have characteristics of a membrane and be located on a surface of one or more at least one of the negative electrode, the circuit, and the interior wall of the cell. The article may be situated in the electrolyte medium and be one of a film, a membrane and a combination comprising characteristics of a film and a membrane in different parts of the combination. The hydrocarbon ionomer may comprise one or more ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized. The copolymer may comprise (meth)acrylic acid comonomer that is acrylic acid comonomer, methacrylic acid comonomer or a combination of acrylic acid and methacrylic acid comonomers. The poly(ethylene-co-(meth)acrylic) acid copolymer may incorporate the (meth)acrylic acid comonomer in an incorporation ratio of less than 20% per mole. The hydrocarbon ionomer may be a neutralized polyvinyl sulfonic acid. The hydrocarbon ionomer may be a neutralized sulfonated derivative of a poly(ether ether-ketone). The article may comprise a plurality of different types of hydrocarbon ionomer.

The above summary is not intended to describe each embodiment or every implementation of the present invention. Further features, their nature and various advantages will be more apparent from the accompanying drawings and the following detailed description of the examples and embodiments.

BRIEF DESCRIPTION OF THE DRAWINGS

The features and advantages of the present invention become more apparent from the detailed description set forth below when taken in conjunction with the drawings in which like reference numbers indicate identical or functionally similar elements. Additionally, the left-most digit of a reference number identifies the drawing in which the reference number first appears.

In addition, it should be understood that the drawings in the figures, which highlight the aspects, methodology, functionality and advantages of the present invention, are presented for example purposes only. The present invention is sufficiently flexible, such that it may be implemented in ways other than that shown in the accompanying figures.

DETAILED DESCRIPTION

Figure 1:
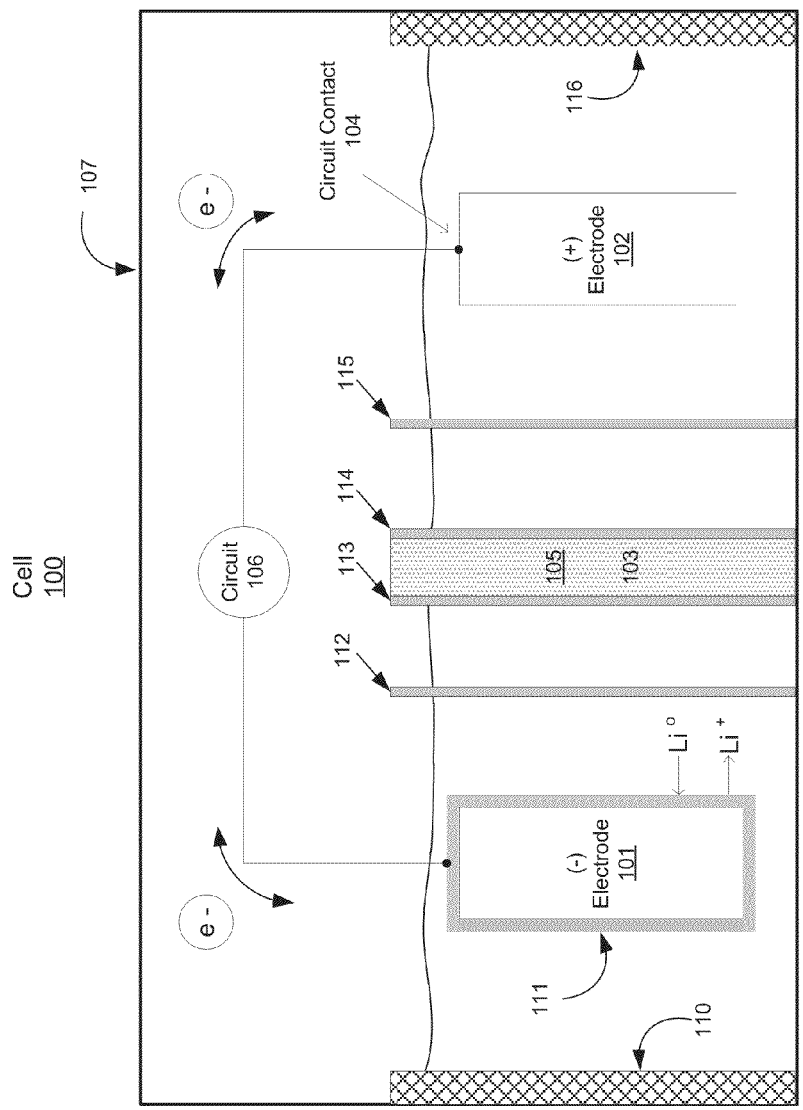
FIG. 1 is a two-dimensional perspective of a Li—S cell incorporating several hydrocarbon ionomer articles, according to an example.

The present invention is useful for certain energy storage applications, and has been found to be particularly advantageous for high maximum discharge capacity batteries which operate with high coulombic efficiency utilizing electrochemical voltaic cells which derive electrical energy from chemical reactions involving sulfur compounds. While the present invention is not necessarily limited to such applications, various aspects of the invention are appreciated through a discussion of various examples using this context.

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily obscure the description. Furthermore, different embodiments are described below. The embodiments may be used or performed together in different combinations.

The operation and effects of certain embodiments can be more fully appreciated from a series of examples, as described below. The embodiments on which these examples are based are representative only. The selection of those embodiments to illustrate the principles of the invention does not indicate that materials, components, reactants, conditions, techniques, configurations and designs, etc. which are not described in the examples are not suitable for use, or that subject matter not described in the examples is excluded from the scope of the appended claims and their equivalents. The significance of the examples can be better understood by comparing the results obtained therefrom with potential results which can be obtained from tests or trials that may be or may have been designed to serve as controlled experiments and provide a basis for comparison.

As used herein, the terms "based on", "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" is employed to describe elements and components. This is done merely for convenience and to give a general sense of the description. This description should be read to include one or at least one and the singular also includes the plural unless it is obvious that it is meant otherwise.

The meaning of abbreviations and certain terms used herein is as follows: "Å" means angstrom(s), "g" means gram(s), "mg" means milligram(s), "µg" means microgram(s), "L" means liter(s), "mL" means milliliter(s), "cc" means cubic centimeter(s), "cc/g" means cubic centimeters per gram, "mol" means mole(s), "mmol" means millimole(s), "M" means molar concentration, "wt. %" means percent by weight, "Hz" means hertz, "mS" means millisiemen(s), "mA" mean milliamp(s), "mAh/g" mean milliamp hour(s) per gram, "mAh/g S" mean milliamp hour(s) per gram sulfur based on the weight of sulfur atoms in a sulfur compound, "V" means volt(s), "x C" refers to a constant current that may fully charge/discharge an electrode in 1/x hours, "SOC" means state of charge, "SEI" means solid electrolyte interface formed on the surface of an electrode material, "kPa" means kilopascal(s), "rpm" means revolutions per minute, "psi" means pounds per square inch, "maximum discharge capacity" is the maximum milliamp hour(s) per gram of a positive electrode in a Li—S cell at the beginning of a discharge phase (i.e., maximum charge capacity on discharge), "coulombic efficiency" is the fraction or percentage of the electrical charge stored in a rechargeable battery by charging and is recoverable during discharging and is expressed as 100 times the ratio of the charge capacity on discharge to the charge capacity on charging, "pore volume" (i.e., Vp) is the sum of the volumes of all the pores in one gram of a substance and may be expressed as cc/g, "porosity" (i.e., "void fraction") is either the fraction (0-1) or the percentage (0-100%) expressed by the ratio: (volume of voids in a substance)/(total volume of the substance).

As used herein and unless otherwise stated the term "cathode" is used to identify a positive electrode and "anode" to identify the negative electrode of a battery or cell. The term "battery" is used to denote a collection of one or more cells arranged to provide electrical energy. The cells of a battery can be arranged in various configurations (e.g., series, parallel and combinations thereof).

The term "sulfur compound" as used herein refers to any compound that includes at least one sulfur atom, such as elemental sulfur and other sulfur compounds, such as lithiated sulfur compounds including disulfide compounds and polysulfide compounds. For further details on examples of sulfur compounds particularly suited for lithium batteries, reference is made to "A New Entergy Storage Material: Organosulfur Compounds Based on Multiple Sulfur-Sulfur Bonds", by Naoi et al., J. Electrochem. Soc., Vol. 144, No. 6, pp. L170-L172 (June 1997), which is incorporated herein by reference in its entirety.

The term "ionomer", as used herein, refers to any polymer including an ionized functional group (e.g., sulfonic acid, phosphonic acid, phosphoric acid or carboxylic acid, such as acrylic or methacrylic acid (i.e., "(meth)acrylic acid") in which the acid group is neutralized with a base including an alkali metal, such as lithium, to form an ionized functionality, such as lithium methacrylate). An ionomer may be made by various methods including polymerizing ionic monomers and by chemically modifying ionogenic polymers. The term "hydrocarbon ionomer", as used herein, refers to any ionomer not including any halogen atoms incorporated by a covalent bond into a site (e.g., the polymer backbone or branching) on the ionomer.

According to the principles of the invention, as demonstrated in the following examples and embodiments, there are Li—S cells incorporating hydrocarbon ionomer articles, such as coatings, films, and membranes. The hydrocarbon ionomer articles may be associated with various elements in a Li—S cell, such as a hydrocarbon ionomer coating on a porous separator or an interior wall of the cell. According to various embodiments, different types of hydrocarbon ionomers may be used in forming one or more of the articles in a cell, such as an ionomer containing acrylate groups based on ionized acrylic acid, methacrylate groups based on ionized methacrylic acid or a combination of both acrylate and methacrylate (i.e., (meth)acrylate) groups.

Examples of hydrocarbon ionomers include SURLYN® and derivatives of SURLYN®, a copolymer of ethylene and (meth)acrylic acid. Depending upon the commercially available grade of SURLYN® that is used, an amount of the ionizable (meth)acrylic acid groups in the SURLYN® can be neutralized to their ionic (meth)acrylate salt. Other examples of hydrocarbon ionomers include sulfonated polyacrylamide and sulfonated polystyrene. Other hydrocarbon ionomers may also be utilized, such as ionomers having ionomer functional groups based on neutralized carboxylic acids, phosphonic acids, phosphoric acids and/or other ionomer functional groups.

Different types of copolymers may be hydrocarbon ionomers, such as copolymers with different non-ionic monomers or multiple types of ionic monomers. Other hydrocarbon ionomers may also be utilized or combined in a hydrocarbon ionomer article, such as different hydrocarbon ionomers with different structures and/or different substituents which may be the same or different ionomer functional groups. As noted above, hydrocarbon ionomers never contain halogen or halogen-containing substituents, but may include other substituents. In an embodiment, a hydrocarbon ionomer may include alcohol and alkyl substituents. For example, a hydrocarbon ionomer may include unsaturated branches with or without any functional groups or substituents. The substituent sites on a hydrocarbon ionomer may be located anywhere in the polymer, such as along the backbone and along any branching which may be present.

Hydrocarbon ionomer may be combined with other components to form hydrocarbon ionomer articles which can be incorporated into a Li—S cell, according to various embodiments. The hydrocarbon ionomer may be identified or quantified with respect to other components in different ways within the article. For example, in a hydrocarbon ionomer article which is a coated porous separator, the separator itself may be made from polyimide, such as a mat or other article made from polyimide fiber, or a polyethylene/polypropylene laminate which is then coated with a hydrocarbon ionomer. In another variant, a hydrocarbon ionomer composition may be prepared which is a blend, such as a combination including hydrocarbon ionomer and a modified polyethylene which is modified to enhance its miscibility with the hydrocarbon ionomer. Additives may also be included, such as a polymer compatibilizer that is combined with the components to stabilize the blend including hydrocarbon ionomer. A composition comprising hydrocarbon ionomer may be molded or press-formed to produce a hydrocarbon ionomer article, such as a porous separator, constituted by the hydrocarbon ionomer alone or a blend containing hydrocarbon ionomer. Hydrocarbon ionomer may also be present as a function of a structure associated with these embodiments, such as a weight measure of hydrocarbon ionomer per surface area of an article, such as a porous separator, or as a weight percentage of the porous separator constituted by a hydrocarbon ionomer blend.

An amount of hydrocarbon ionomer in an article may be quantified in terms of an amount of hydrocarbon ionomer associated with a volume of material in a coating or a membrane, or below an area on the surface of an element in an Li—S cell, such as a porous separator, an interior wall of the cell, a positive electrode, a negative electrode, a circuit coupling electrodes or another cell element exposed to electrolyte medium in the cell. According to an embodiment, a suitable amount of hydrocarbon ionomer in a coating is about 0.0001 to 100 mg/cm$^2$. In other embodiments, a suitable amount of hydrocarbon ionomer in a coating is about 0.001 to 75 mg/cm$^2$, about 0.001 to 50 mg/cm$^2$, about 0.001 to 35 mg/cm$^2$, about 0.01 to 20 mg/cm$^2$, about 0.01 to 15 mg/cm$^2$, about 0.1 to 10 mg/cm$^2$ and about 0.3 to 5 mg/cm$^2$.

An amount of hydrocarbon ionomer may be expressed as a weight percentage present in an article, such a membrane or a film. In this example, the membrane or film may be an element in another article, such as porous separator. The hydrocarbon ionomer may also be part of more than one article, such as a porous separator made from a hydrocarbon ionomer blend and coated with a pure hydrocarbon ionomer coating. The hydrocarbon ionomer loading in an element may be varied as desired. According to an embodiment, a suitable amount of hydrocarbon ionomer in an article is about 0.0001 to 100 wt. %. According to other embodiments, a suitable amount of hydrocarbon ionomer in an article is about 0.0001 wt. % to about 99 wt. %, 98 wt. %, 95 wt. %, 90 wt. %, 85 wt. %, 80 wt. %, 75 wt. %, 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, 5 wt. %, 2 wt. %, 1 wt. %, 0.1 wt. %, 0.01 wt. % and 0.001 wt. %.

In an embodiment, a hydrocarbon ionomer article may modify another element in a cell, such as a hydrocarbon ionomer coating on a porous separator. In another embodiment, a hydrocarbon ionomer article may form a separate element in a cell, such as a hydrocarbon ionomer film or a membrane which is situated in the cell solution, separate from other elements in the cell. Such an article may float freely in the cell solution or be secured, such as affixed to a cell wall. In this circumstance, the hydrocarbon ionomer film or membrane, may be fully or partially situated within the electrolyte medium, such as a cell solution in a Li—S cell, and may be secured by fastening an edge of the film or membrane to the interior wall of the cell or affixing it to another element or part in the cell.

Referring to FIG. 1, depicted is a cell 100, such as a Li—S cell in a Li—S battery. Cell 100 includes a lithium containing negative electrode 101, a sulfur-containing positive electrode 102, a circuit 106 and a porous separator 105. A cell container wall 107 contains the elements in the cell 100 with an electrolyte medium, such as a cell solution comprising solvent and electrolyte. The positive electrode 102 includes a circuit contact 104. The circuit contact 104 provides a conductive conduit through a metallic circuit 106 coupling the negative electrode 101 and the positive electrode 102. The positive electrode 102 is operable in conjunction with the negative electrode 101 in the cell 100 to store electrochemical voltaic energy and release electrochemical voltaic energy, this converting chemical and electrical energy from one form to the other, depending upon the whether the cell 100 is in the charge phase or discharge phase. A porous carbon material, such as a carbon powder, having a high surface area and a high pore volume, may be utilized in the making the positive electrode 102. According to an embodiment, sulfur compound, such as elemental sulfur, lithium sulfide, and combinations of such, may be introduced to the porous regions within the carbon powder to make a carbon-sulfur (C—S) composite which is incorporated into a cathode composition in the positive electrode 102. A polymeric binder may also be incorporated into the cathode composition with the C—S composite in the positive electrode 102. In addition, other materials may be utilized in the positive electrode 102 to host the sulfur compound as an alternative to the carbon powder, such as graphite, graphene and carbon fibers. The construction of the positive electrode 102 may be varied as desired.

The porous separator 105 in cell 100 incorporates a composition 103, and is a hydrocarbon ionomer article. The composition 103 comprises hydrocarbon ionomer, optionally in a blend including other components such as additives and/or other polymers which are miscible with the hydrocarbon ionomer. An example of such a miscible polymer is an ethylene copolymer with polar functional groups grafted to promote miscibility with the hydrocarbon ionomer in the composition 103. When situated in the cell 100, the composition 103 within the porous separator 105 may be exposed to an amount of the cell solution contained inside or passing through a pore volume within the porous separator 105. The exposed areas of the composition 103 within the porous separator 105 appears to function as a barrier to limit the passage of soluble sulfur compounds "shuttling" through the cell solution within the pore volume from reaching the negative electrode 101. The composition 103 may also function as a reservoir through adsorption of the sulfur compounds from the cell solution in the pore volume, thus withdrawing these sulfur compounds temporarily from the cell solution in the pore volume of the porous separator 105. However, the composition 103 in the porous separator 105 still permits diffusion of lithium ions through the pore volume to and from the negative electrode 101 during charge and discharge phases in the cell 100.

Cell 100 also includes membranes 111, 112 and 115, coatings 113 and 114 and films 110 and 116, all of which are hydrocarbon ionomer articles. These elements of cell 100 incorporate compositions comprising hydrocarbon ionomer. The compositions may be the same or different from each other and composition 103.

Membrane 111 is an anodic-membrane as it is affixed or in close proximity to a surface of the negative electrode 101. Membrane 111 comprises hydrocarbon ionomer. In an embodiment, membrane 111 includes a protective layer, separating lithium metal in the negative electrode 101 from the hydrocarbon ionomer in membrane 111. The protective layer comprises a permeable substance which is substantially inert to lithium metal in the negative electrode 101. Suitable inert substances include porous films containing polypropylene and polyethylene. According to an embodiment, the hydrocarbon ionomer in membrane 111 is a derivative of SURLYN® in which the SURLYN® is partially neutralized with a lithium ion source. In other embodiments, membrane 111 may comprise other hydrocarbon ionomers, as alternatives or in addition to the SURLYN® derivative in the anodic-membrane. The membrane 111 is permeable, but functions in the cell 100 as a barrier to limit the passage of soluble sulfur compounds in the cell solution from reaching the negative electrode 101. Membrane 111 may also function as a reservoir through adsorption of soluble sulfur compounds from the cell solution or by otherwise limiting their passage through a pore structure in the membrane 111. However, membrane 111 permits diffusion of lithium ions to and from the negative electrode 101 during charge-discharge cycles in the cell 100.

Coatings 113 and 114 are applied to respective separate surfaces of the porous separator 105. The coatings 113 and 114 may be applied through various well-known techniques such as spray coating, dip coating and the like. Coatings 113 and 114 comprise hydrocarbon ionomer, such as a hydrocarbon ionomer with carboxylate, sulfonate, phosphate, and/or phosphonate groups, or may comprise a plurality of different types of hydrocarbon ionomer. Like the membrane 111, the coatings 113 and 114 are permeable, but appear to function as a barrier to soluble sulfur compounds from reaching the negative electrode 101 by limiting their passage by diffusion through the cell solution. The coatings 113 and 114 may also function as reservoirs for the sulfur compounds, possibly through adsorption or by otherwise limiting the passage of soluble sulfur compounds through pores in coatings 113 and 114. While the coatings 113 and 114 appear to act as barriers and/or reservoirs for soluble sulfur compounds in the cell solution, they permit the diffusion of lithium ions to and from the negative electrode 101 during charge-discharge cycles in the cell 100.

Membranes 112 and 115 are fully situated within the cell solution of the cell 100. Both membranes 112 and 115 are located between positive electrode 102 and the negative electrode 101. However, the respective membranes are on different respective sides of the porous separator 105. Membranes 112 and 115 may be secured within cell 100 by being affixed to another object in the cell 100, such as the cell container wall 107. Membranes 112 and 115 comprise hydrocarbon ionomer with ionic functional groups, such as carboxylate, sulfonate, phosphate and/or phosphonate groups and may comprise a plurality of different types of hydrocarbon ionomer. Membranes 112 and 115 are permeable, but they function to limit the passage of soluble sulfur compounds in the cell solution from reaching the negative electrode 101 by acting as barriers to the sulfur compounds. Membranes 112 and 115 may also act as reservoirs through adsorption of the sulfur compounds. However, the membranes 112 and 115 permit the diffusion of lithium ions through their respective pores to pass between the positive electrode 102 and the negative electrode 101 during charge-discharge cycles in the cell 100.

Films 110 and 116 are situated in the cell 100 so as to be partially exposed to the cell solution. Films 110 and 116 do not separate the positive electrode 102 and negative electrode 101. Therefore, films 110 and 116 may be permeable or impermeable. Films 110 and 116 are secured within cell 100 by being affixed to the cell container wall 107. The respective films 110 and 116 comprise respective hydrocarbon ionomer that may be the same or different, such as a hydrocarbon ionomer with carboxylate, sulfonate, phosphate, and/or phosphonate groups and may comprise a plurality of different types of hydrocarbon ionomer. Although the films 110 and 116 may not be permeable, they appear to function as reservoirs to soluble sulfur compounds, and limit the passage of sulfur compounds in the cell solution from reaching the negative electrode 101. Without being bound by any particular theory, they appear to accomplish this through the adsorption of sulfur compounds from the electrolyte solution during charge-discharge cycles in the cell 100.

According to the principles of the invention, a Li—S cell, such as cell 100, incorporates at least one hydrocarbon ionomer article and may incorporate multiple hydrocarbon ionomer articles as demonstrated in cell 100, and in various other combinations and configurations. In one embodiment, the hydrocarbon ionomer articles comprise a polymeric sulfonate. In another embodiment, the hydrocarbon ionomer articles comprise a polymeric carboxylate. In yet another embodiment the hydrocarbon ionomer articles comprise a polymeric phosphate. In yet another embodiment the hydrocarbon ionomer articles comprise a polymeric phosphonate. In still another embodiment, the hydrocarbon ionomer articles comprise a copolymer including at least two types of ionic functionality. In still yet another embodiment, the hydrocarbon ionomer articles comprise at least two different types of hydrocarbon ionomer with different ionic functionality in the different types of hydrocarbon ionomers.

Hydrocarbon ionomers which are suitable for use herein, include ionomers which include pendant negatively charged functional groups which are neutralized. The negatively charged functional groups, such as an acid (e.g., carboxylic acid, phosphonic acid and sulfonic acid) or an amide (e.g., acrylamide). These negatively charged functional groups are neutralized, fully or partially with a metal ion, preferably with an alkali metal. Lithium is preferred for utilization in a Li—S cell. The hydrocarbon ionomers may contain negatively-charged functional groups, exclusively (i.e., anionomers) or may contain a combination of negatively-charged functional groups with some positively-charged functional groups (i.e., ampholytes).

The hydrocarbon ionomers may include ionic monomer units copolymerized with nonionic (i.e., electrically neutral) monomer units. The hydrocarbon ionomers can be prepared by polymerization of ionic monomers, such as ethylenically unsaturated carboxylic acid comonomers. Other hydrocarbon ionomers which are suitable for making the articles are ionically modified "ionogenic" polymers which made ionomers by chemical modification of negatively charged functional groups on the ionogenic polymer (i.e., chemical modification after polymerization), such as by treatment of a polymer having carboxylic acid functionality which is chemically modified by neutralizing to form ester-containing carboxylate functional groups which are ionized with an alkali metal, thus forming negatively charged ionic functionality. The ionic functional groups may be randomly distributed or regularly located in the hydrocarbon ionomers.

The hydrocarbon ionomers may be polymers including ionic and non-ionic monomeric units in a saturated or unsaturated backbone, optionally including branching, which is carbon based and may include other elements, such as oxygen or silicon. The negatively charged functional groups may be any species capable of forming an ion with an alkali metal. These include, but are not limited to, sulfonic acids, carboxylic acids and phosphonic acids. According to an embodiment, the polymer backbone or branches in the hydrocarbon ionomer may include comonomers such as alkyls. Alkyls which are α-olefins are preferred. Suitable α-olefin comonomers include, but are not limited to, ethylene, propylene, 1-butene, 1-pentene, 1-hexene, 1-heptene, 3 methyl-1-butene, 4-methyl-1-pentene, styrene and the like and mixtures of two or more of these α-olefins.

According to an embodiment, hydrocarbon ionomers are ionogenic acid copolymers which are neutralized with a base so that the acid groups in the precursor acid copolymer form ester salts, such as carboxylate or sulfonate groups. The precursor acid copolymer groups may be fully neutralized or partially neutralized to a "neutralization ratio" based on the amount neutralized of all the negatively charged functional groups that may be neutralized in the ionomer. According to an embodiment, the neutralization ratio is 0% to about 1%. In other embodiments, the neutralization ratio is about 5%, about 10%, about 20%, about 30%, about 40%, about 50%, about 60%, about 70%, about 80%, about 90%, about 95%, or about 100%. According to an embodiment, the neutralization ratio is about 0% to 90%. In other embodiments, the neutralization ratio is about 20% to 80%, about 30% to 70%, about 40% to 60% or about 50%.

The neutralization ratio may be selected for different properties, such as to promote conductivity in the ionomer, to promote the dispersability of the hydrocarbon ionomer in a particular solvent or to promote miscibility with another polymer in a blend. Methods of changing the neutralization ratio include increasing the neutralization, such as by introducing basic ion sources to promote a greater degree of ionization among the monomer units. Methods of changing the neutralization ratio also include those for decreasing neutralization, such as by introducing a highly neutralized ionomer to strong acids so as to convert some or all of an ionic functionality (e.g., (meth)acrylate) to an acid (e.g., (meth)acrylic acid).

Although any stable cation is believed to be suitable as a counter-ion to the negatively charged functional groups in a hydrocarbon ionomer, monovalent cations, such as cations of alkali metals, are preferred. Still more preferably, the base is a lithium ion-containing base, to provide a lithiated hydrocarbon ionomer wherein part or all of the precursor groups are replaced by lithium salts. To obtain the hydrocarbon ionomers, the precursor polymers may be neutralized by any conventional procedure with an ion source. Typical ion sources include sodium hydroxide, sodium carbonate, zinc oxide, zinc acetate, magnesium hydroxide, and lithium hydroxide. Other ion sources are well known and a lithium ion source is preferred.

According to an embodiment, a suitable hydrocarbon ionomer includes ethylene-(meth)acrylic acid copolymer having about 5 to 25 wt. % (meth)acrylic acid monomer units based on the weight of the ethylene-(meth)acrylic acid copolymer; and more particularly, the ethylene-(meth)acrylic acid copolymer has a neutralization ratio of 0.40 to about 0.70. Hydrocarbon ionomers suitable for use herein are available from various commercial sources or they can be prepared by synthesis.

SURLYN® is an example of a carboxylate hydrocarbon ionomer which is a random copolymer-poly(ethylene-co-(meth)acrylic acid). E.I. du Pont de Nemours and Co., Wilmington, Del., provides the SURLYN® resin brand, a copolymer of ethylene and (meth)acrylic acid. It is produced through the copolymerization of ethylene and (meth)acrylic acid via a high pressure free radical reaction, similar to that for the production of low density polyethylene and has an incorporation ratio of (meth)acrylic comonomer that is relatively low and is typically less than 20% per mole and often less than 15% per mole of the copolymer. Variants of the SURLYN® resin brand are disclosed in U.S. Pat. No. 6,518,365 which is incorporated by reference herein in its entirety. According to an embodiment, particularly useful hydrocarbon ionomers include SURLYN® and variants of SURLYN® which are derivatives of commercially available forms of SURLYN®. One SURLYN® variant may be made by treating SURLYN® with a strong acid to reduce the overall neutralization ratio to promote its dispersability in aqueous solution. According to another variant, SURLYN® is ion-exchanged to increase the lithium ion content.

The hydrocarbon ionomer may be neutralized. Neutralization of the hydrocarbon ionomer may be with a neutralization agent that may be represented by the formulas MA where M is a metal ion and A is the co-agent moiety such as an acid or base. Metal ions suitable as the metal ion include monovalent, divalent, trivalent and tetravalent metals. Metal ions suitable for use herein include, but are not limited to, ions of Groups IA, IB, IIA, IIB, IIIA, IVA, IVB, VB, VIIB, VIIB and VIII metals of the Periodic Table. Examples of such metals include $Na^+$, $Li^+$, $K^+$ and $Sn^{4+}$. $Li^+$ is preferred for uses of the hydrocarbon ionomer in a Li—S cell.

Neutralization agents suitable for use herein include any metal moiety which would be sufficiently basic to form a salt with a low molecular weight organic acid, such as benzoic acid or p-toluene sulfonic acid. One suitable neutralization agent is lithium hydroxide distributed by Sigma Aldrich (Sigma Aldrich, 545856). Other neutralization agents and neutralization processes to form hydrocarbon ionomers are described in U.S. Pat. No. 5,003,012 which is incorporated by reference herein in its entirety.

Other hydrocarbon ionomers which are suitable include block copolymers such as those derived from the sulphonation of polystyrene-b-polybutadiene-b-polystyrene. Sulfonated polysulphones and sulfonated polyether ether ketones are also suitable. Phosphonate hydrocarbon ionomers may also be used, as well as copolymers with more than one ionic functionality. For example, direct co-polymerization of dibutyl vinylphosphonate with acrylic acid yields a mixed carboxylate-phosphonate ionomer. Copolymers derived from vinyl phosphonates with styrene, methyl methacrylate, and acrylamide may also be used. Phosphorus containing polymers can also be made after polymerization by phosphonylation reactions, typically with POCl3. For example, phosphonylation of polyethylene can produce a polyethylene-phosphonic acid copolymer.

Hydrocarbon ionomers which are suitable for use include carboxylate, sulfonate and phosphonate hydrocarbon ionomers. Others are also suitable, such as styrene alkoxide hydrocarbon ionomers such as those derived from polystyrene-co-4-methoxy styrene. A hydrocarbon ionomer may have a polyvinyl or a polydiene backbone. Different hydrocarbon ionomers may differ in properties, partly due to differences in the strength of the ionic interactions and structure. Carboxylate hydrocarbon ionomers, sulfonate hydrocarbon ionomers, and their mixtures are preferred. Also hydrocarbon ionomers in which the negatively charged ionic functional groups are neutralized with a lithium ion source to form a salt with lithium are preferred.

The positive electrode 102 in cell 100 may be made by incorporating a cathode composition comprising carbon-sulfur (C—S) composite made from sulfur compound and carbon powder. The cathode composition may also include a non-ionomeric polymeric binder, a carbon black and a hydrocarbon ionomer.

A representative carbon powder for making the C—S composite is KETJENBLACK EC-600JD, distributed by Akzo Nobel having an approximate surface area of 1400 $m^2/g$ BET (Product Data Sheet for KETJENBLACK EC-600JD, Akzo Nobel) and an approximate pore volume of 4.07 cc/gram, as determined according to the BJH method, based on a cumulative pore volume for pores ranging from 17-3000 angstroms. In the BJH method, nitrogen adsorption/desorption measurements were performed on ASAP model 2400/2405 porosimeters (Micrometrics, Inc., No. 30093-1877). Samples were degassed at 150° C. overnight prior to data collection. Surface area measurements utilized a five-point adsorption isotherm collected over 0.05 to 0.20 p/p$_0$ and were analyzed via the BET method, described in Brunauer et al., J. Amer. Chem. Soc., v. 60, no. 309 (1938), and incorporated by reference herein in its entirety. Pore volume distributions utilized a 27 point desorption isotherm and were analyzed via the BJH method, described in Barret, et al., J. Amer. Chem. Soc., v. 73, no. 373 (1951), and incorporated by reference herein in its entirety.

Additional commercially available carbon powders which may be utilized include KETJEN 300: approximate pore volume 1.08 cc/g (Akzo Nobel) CABOT BLACK PEARLS: approximate pore volume 2.55 cc/g, (Cabot), PRINTEX XE-2B: approximate pore volume 2.08 cc/g (Orion Carbon Blacks, The Cary Company). Other sources of such carbon powders are known to those having ordinary skill in the art.

Other porous carbon materials suitable for use herein may be manufactured or synthesized using known processes, as desired, for their pore volume, surface area and other features. Porous carbon materials suitable for use herein include templated carbons. Templated carbon has a synthesized carbon microstructure which is complementary to an inorganic template used in making the templated carbon. Templated carbon materials are demonstrated in co-assigned and co-pending U.S. Patent Application Ser. No. 61/587,805, filed on Jan. 18, 2013, which is incorporated by reference herein in its entirety.

Carbon powders which are suitable for making the C—S composite include those having a surface area of about 100 to 4,000 square meters per gram carbon powder, about 200 to 3,000 square meters per gram, about 300 to 2,500 square meters per gram carbon powder, about 500 to 2,200 square meters per gram, about 700 to 2,000 square meters per gram, about 900 to 1,900 square meters per gram, about 1,100 to 1,700 square meters per gram and about 1,300 to 1,500 square meters per gram carbon powder.

Carbon powders which are suitable for making the C—S composite also include those having a pore volume ranging from about 0.25 to 10 cc per gram carbon powder, from about 0.7 to 7 cc per gram, from about 0.8 to 6 cc per gram, from about 0.9 to 5.5 cc per gram, from about 1 to 5.2 cc per gram, from about 1.1 to 5.1 cc per gram, from about 1.2 to 5 cc per gram, from about 1.4 to 4 cc per gram, and from about 2 to 3 cc per gram. A particularly useful carbon powder is one having a pore volume that is greater than 1.2 cc per gram and less than 5 cc per gram carbon powder.

Sulfur compounds which are suitable for making the C—S composite include molecular sulfur in its various allotropic forms and combinations thereof, such as "elemental sulfur". Elemental sulfur is a common name for a combination of sulfur allotropes including puckered S$_8$ rings, and often including smaller puckered rings of sulfur. Other sulfur compounds which are suitable are compounds containing sulfur and one or more other elements. These include lithiated sulfur compounds, such as for example, Li$_2$S or Li$_2$S$_2$. A representative sulfur compound is elemental sulfur distributed by Sigma Aldrich as "Sulfur", (Sigma Aldrich, 84683). Other sources of such sulfur compounds are known to those having ordinary skill in the art.

A non-ionomer polymeric binder which may be utilized for making the cathode composition includes polymers exhibiting chemical resistance, heat resistance as well as binding properties, such as polymers based on alkylenes, oxides and/or fluoropolymers. Examples of these polymers include polyethylene oxide (PEO), polyisobutylene (PIB), and polyvinylidene fluoride (PVDF). A representative polymeric binder is polyethylene oxide (PEO) with an average M$_w$ of 600,000 distributed by Sigma Aldrich as "Poly(ethylene oxide)", (Sigma Aldrich, 182028). Another representative polymeric binder is polyisobutylene (PIB) with an average M$_w$ of 4,200,000 distributed by Sigma Aldrich as "Poly(isobutylene)", (Sigma Aldrich, 181498). Polymeric binders which are suitable for use herein are also described in U.S. Published Patent Application No. US2010/0068622, which is incorporated by reference herein in its entirety. Other sources of polymeric binders are known to those having ordinary skill in the art.

Carbon blacks which are suitable for making the cathode composition include carbon substances exhibiting electrical conductivity and generally having a lower surface area and lower pore volume relative to the carbon powder described above. Carbon blacks typically are colloidal particles of elemental carbon produced through incomplete combustion or thermal decomposition of gaseous or liquid hydrocarbons under controlled conditions. Other conductive carbons which are also suitable are based on graphite. Suitable carbon blacks include acetylene carbon blacks which are preferred. A representative carbon black is SUPER C65 distributed by Timcal Ltd. and having BET nitrogen surface area of 62 m$^2$/g carbon black measured by ASTM D3037-89. Other commercial sources of carbon black, and methods of manufacturing or synthesizing them, are known to those having ordinary skill in the art.

Carbon blacks which are suitable for use herein include those having a surface area ranging from about 10 to 250 square meters per gram carbon black, about 30 to 200 square meters per gram, about 40 to 150 square meters per gram, about 50 to 100 square meters per gram and about 60 to 80 square meters per gram carbon black.

The C—S composite includes a porous carbon material, such as carbon powder, containing the sulfur compound situated in the carbon microstructure of the porous carbon material. The amount of sulfur compound which may be contained in the C—S composite (i.e., the sulfur loading in terms of the weight percentage of sulfur compound, based on the total weight of the C—S composite, is dependent to an extent on the pore volume of the carbon powder. Accordingly, as the pore volume of the carbon powder increases, higher sulfur loading with more sulfur compound is possible. Thus, a sulfur compound loading of, for example, about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 85 wt. %, 90 wt. % or 95 wt. % may be used. Ranges among these amounts define embodiments which may be used.

The cathode composition may include various weight percentages of C—S composite. The cathode composition may optionally include non-ionomer polymeric binder, hydrocarbon ionomer, and carbon black in addition to the C—S composite. Exclusive of the amount of hydrocarbon ionomer present, C—S composite is generally present in the cathode composition in an amount which is greater than 50 wt. % of the remainder (i.e., excluding hydrocarbon ionomer) of the cathode composition. Higher loading with more C—S composite is possible. Thus, exclusive of the amount of hydrocarbon ionomer present, a C—S composite loading of, for example, about 55 wt. %, 60 wt. %, 65 wt. %, 70 wt. %, 75 wt. %, 80 wt. %, 85 wt. %, 90 wt. %, 95 wt. %, 98 wt. %, or 99 wt. % may be used. According to an embodiment, exclusive of the amount of hydrocarbon ionomer present, about 50 to 99 wt. % C—S composite may be used. In another embodiment, exclusive of the amount of hydrocarbon ionomer present, about 70 to 95 wt. % C—S composite may be used. Ranges among these amounts define embodiments which may be used.

Exclusive of the amount of hydrocarbon ionomer present, polymeric binder (i.e., non-ionomer polymeric binder) may be present in the cathode composition in an amount which is greater than 1 wt. %. Higher loading with more polymeric binder is possible. Thus, a polymeric binder loading of, for example, about 2 wt. %, 3 wt. %, 4 wt. %, 5 wt. %, 6 wt. %, 7 wt. %, 8 wt. %, 9 wt. %, 10 wt. %, 12 wt. %, 14 wt. %, 16 wt. %, or 17.5 wt. % may be used exclusive of the amount of hydrocarbon ionomer present. According to an embodiment, about 1 to 17.5 wt. % polymeric binder may be used exclusive of the amount of hydrocarbon ionomer present. In another embodiment, about 1 to 12 wt. % polymeric binder may be used exclusive of the amount of hydrocarbon ionomer present. In another embodiment, about 1 to 9 wt. % polymeric binder may be used exclusive of the amount of hydrocarbon ionomer present. Ranges among these amounts define embodiments which may be used.

According to an embodiment, the carbon black may optionally be present in the cathode composition in an amount which is greater than 0.01 wt. %. Higher loading with more carbon black is possible. Thus, a carbon black loading, exclusive of the amount of hydrocarbon ionomer present, of about 0.1 wt. %, about 1 wt. %, about 2 wt. %, 3 wt. %, 4 wt. %, 5 wt. %, 6 wt. %, 8 wt. %, 10 wt. %, 12 wt. %, 14 wt. %, 15 wt. %, or 20 wt. % may be used. According to an embodiment, about 0.01 to 15 wt. % carbon black may be used, exclusive of the amount of hydrocarbon ionomer present. In another embodiment, about 5 to 10 wt. % carbon black may be used, exclusive of the amount of hydrocarbon ionomer present. Ranges among these amounts define embodiments which may be used.

The C—S composite may made by various methods, including simply mixing, such as by dry grinding, the carbon powder with the sulfur compound. C—S composite may also be made by introducing the sulfur compound into the microstructure of the carbon powder utilizing such vehicles as heat, pressure, liquid (e.g., a dissolution of sulfur compound in carbon disulfide and impregnation by contacting the solution with the carbon powder), etc.

Useful methods for introducing sulfur compound into the carbon powder include melt imbibement and vapor imbibement. These are compositing processes for introducing the sulfur compound into the microstructure of the carbon powder utilizing such vehicles as heat, pressure, liquid, etc.

In melt imbibement, a sulfur compound, such as elemental sulfur can be heated above its melting point (about 113° C.) while in contact with the carbon powder to impregnate it. The impregnation may be accomplished through a direct process, such as a melt imbibement of elemental sulfur, at a raised temperature, by contacting the sulfur compound and carbon at a temperature above 100° C., such as 160° C. A useful temperature range is 120° C. to 170° C.

Another imbibement process which may be used for making the C—S composite is vapor imbibement which involves the deposition of sulfur vapor. The sulfur compound may be raised to a temperature above 200° C., such as 300° C. At this temperature, the sulfur compound is vaporized and placed in proximity to, but not necessarily in direct contact with, the carbon powder.

These processes may be combined. For example, melt imbibement process can be followed by a higher temperature process. Alternatively, the sulfur compound can be dissolved in carbon disulfide to form a solution and the C—S composite can be formed by contacting this solution with the carbon powder. The C—S composite is prepared by dissolving sulfur compound in non-polar solvent such as toluene or carbon disulfide and contacted with the carbon powder. The solution or dispersion can be contacted, optionally, at incipient wetness to promote an even deposition of the sulfide compound into the pores of the carbon powder. Incipient wetness is a process in which the total liquid volume exposed to the carbon powder does not exceed the volume of the pores of that porous carbon material. The contacting process can involve sequential contacting and drying steps to increase the weight % loading of the sulfur compound.

Sulfur compound may also be introduced to the carbon powder by other methods. For example, sodium sulfide ($Na_2S$) can be dissolved in an aqueous solution to form sodium polysulfide. The sodium polysulfide can be acidified to precipitate the sulfur compound in the carbon powder. In this process, the C—S composite may require thorough washing to remove salt byproducts.

Suitable introducing methods include melt imbibement and vapor imbibement. One method of melt imbibement includes heating elemental sulfur ($Li_2S$ will not melt under these conditions) and carbon powder at about 120° C. to about 170° C. in an inert gas, such as nitrogen. A vapor imbibement method may also be utilized. In the vapor imbibement method, sulfur vapor may be generated by heating a sulfur compound, such as elemental sulfur, to between the temperatures of about 120° C. and 400° C. for a period of time, such as about 6 to 72 hours in the presence of the carbon powder. Other examples of melt imbibement and vapor imbibement are shown in co-assigned and co-pending U.S. Patent Application Ser. No. 61/587,805, filed on Jan. 18, 2013, which is incorporated by reference above.

According to an embodiment, a C—S composite formed by a compositing process may be combined with hydrocarbon ionomer and, optionally, polymeric binder and carbon black by conventional mixing or grinding processes. A solvent, preferably an organic solvent, such as toluene, alcohol, or n-methylpyrrolidone (NMP) may optionally be utilized. The solvent should preferably not react with the hydrocarbon ionomer or polymeric binder, if any, so as to break these down, or significantly alter them. Conventional mixing and grinding processes are known to those having ordinary skill in the art. The ground or mixed components may form a composition 103, according to an embodiment, which may be processed or incorporated and/or formed into an electrode.

According to another embodiment, a layering or an electrode incorporating a cathode composition may be made through a layering process to form the layering and the electrode. The layering process may utilize, for example, a porous carbon material, such as carbon powder, having a pore volume greater than 1.2 cc/g in a C—S composite. The layering and the electrode may be formed through the application of one or several individual layers on a surface of a detachable substrate. The hydrocarbon ionomer may be incorporated into the layering in a variety of ways, including simply mixing the hydrocarbon ionomer in a composition with the C—S composite and optionally, a polymeric binder and any other components.

The hydrocarbon ionomer may also be incorporated by applying separate coats including a hydrocarbon ionomer in a composition with a lesser amount or excluding the C—S composite and/or other components such as polymeric binder and carbon black. In one example, after a composition including the C—S composite is applied to form a layering/electrode, the hydrocarbon ionomer may be applied in a separate layer above the base composition with the C—S composite. In another example, the hydrocarbon ionomer may be applied as a dispersion which is interleaved or applied in alternate coating applications along with a base composition including C—S composite.

The individual layers in a spray coated layering or electrode may have the same or different proportions of different components. For example, different sets of materials with different components and different proportions of components may be prepared and applied in combination to form a layering or electrode. One or more components may be completely absent from any one material applied this way. The different materials may be applied using different coating apparatuses and different application techniques.

For example, two cathode compositions with different C—S components may be prepared with different C—S composites or different amounts of C—S composites. In this example, the respective C—S composites in the two different C—S components may have respective porous carbon materials with differing physical properties, respective sulfur loadings, etc. The two cathode compositions may be applied in alternate passes of spray coating for a layering in an electrode with an average amount of the two compositions throughout or with localized concentrations of one or the other of the two compositions. The components in the different sets of compositions may vary according to multiple parameters, such as respective hydrocarbon ionomers, respective weight percentages hydrocarbon ionomer, respective polymeric binders, respective weight percentages polymeric binder, respective C—S composites, respective weight percentages C—S composite, respective carbon powders and respective weight percentages sulfur in the respective C—S composites of the different compositions.

Also, a porogen (i.e., a void or pore generator) may be included within the layers themselves in the positive electrode. A porogen is any additive which can be removed by a chemical or thermal process to leave behind a void, changing the pore structure of the layering or electrode. This level of porosity control may be utilized in terms of managing mass transfer in a laying or electrode layer. For example, a porogen may be a carbonate, such as calcium carbonate powder, which is added to an ink slurry and then coated in combination with other components in the ink slurry, such as C—S composite, polymeric binder and an optional conductive carbon, onto an aluminum foil current collector to form a layering or electrode. A porogen may also be added in intervening layers and between layers containing the C—S composite. It may be desirable to add the porogen in higher concentrations closer to the current collector to create a gradient in the direction of the thickness of the layering or electrode. Once the porogen is in place in the formed layering or electrode, it may then be removed from by washing with dilute acid to leave a void or pore. The type of porogen and the amount can be varied in each layer to control the porosity of the layering or electrode.

Referring again to FIG. 1, depicted is the positive electrode 102, that may be formed incorporating a cathode composition as described above. The formed positive electrode 102 may be utilized in the cell 100 in conjunction with a negative electrode, such as the lithium-containing negative electrode 101 described above. According to different embodiments, the negative electrode 101 may contain lithium metal or a lithium alloy. In another embodiment, the negative electrode 101 may contain graphite or some other non-lithium material. According to this embodiment, the positive electrode 102 is formed to include some form of lithium, such as lithium sulfide ($Li_2S$), and according to this embodiment, the C—S composite may be lithiated utilizing lithium sulfide which is incorporated into the powdered carbon to form the C—S composite, instead of elemental sulfur.

A porous separator, such as porous separator 105, may be constructed from various materials. As an example, a mat or other porous article made from fibers, such as polyimide fibers, which may be used as a porous separator. In another example, using porous laminates made from polymers such as polyvinylidene fluoride (PVDF), polyvinylidene fluoride co-hexafluoropropylene (PVDF-HFP), polyethylene (PE), polypropylene (PP), and polyimide. In addition, polymers with sufficient functionality or modifications to promote miscibility with a hydrocarbon ionomer in a polymer blend may also be used in a blend with a hydrocarbon ionomer.

Positive electrode 102, negative electrode 101 and porous separator 105 are in contact with a lithium-containing electrolyte medium in the cell 100, such as a cell solution with solvent and electrolyte. In this embodiment, the lithium-containing electrolyte medium is a liquid. In another embodiment, the lithium-containing electrolyte medium is a solid. In yet another embodiment, the lithium-containing electrolyte medium is a gel.

Figure 2:
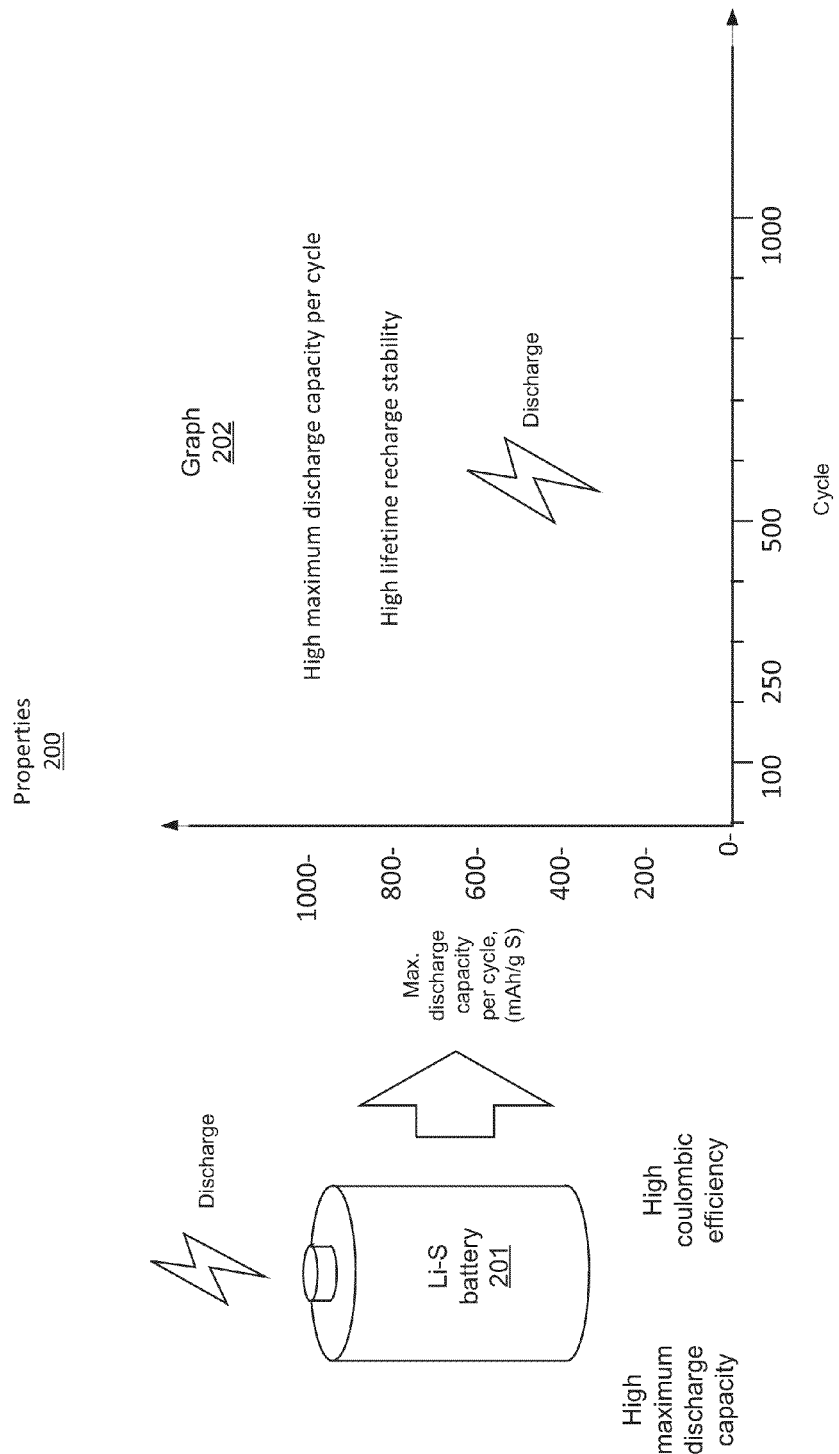
FIG. 2 is a context diagram illustrating properties of a Li—S battery including a Li—S cell incorporating a hydrocarbon ionomer article, according to an example.

Referring to FIG. 2, depicted is a context diagram illustrating properties 200 of a Li—S battery 201 including a Li—S cell, such as cell 100, having a positive electrode including sulfur, such as electrode 102. The Li—S cell in Li—S battery 201 incorporates one or more hydrocarbon ionomer articles such as films, membranes, coatings and compositions, such as described above with respect to cell 100. The context diagram of FIG. 2 demonstrates the properties 200 of the Li—S battery 201, having a high coulombic efficiency and high maximum discharge capacity associated with its discharge. The high coulombic efficiency appears to be directly attributable to the presence of the hydrocarbon ionomer articles in the Li—S cell of Li—S battery 201. FIG. 2 also depicts a graph 202 demonstrating maximum discharge capacity per cycle of Li—S battery 201 with respect to a number of charge-discharge cycles. The Li—S battery 201 also exhibits high lifetime recharge stability and a high maximum discharge capacity per charge-discharge cycle. All these properties 200 of the Li—S battery 201 are demonstrated in greater detail below through the specific examples.

Figure 3:
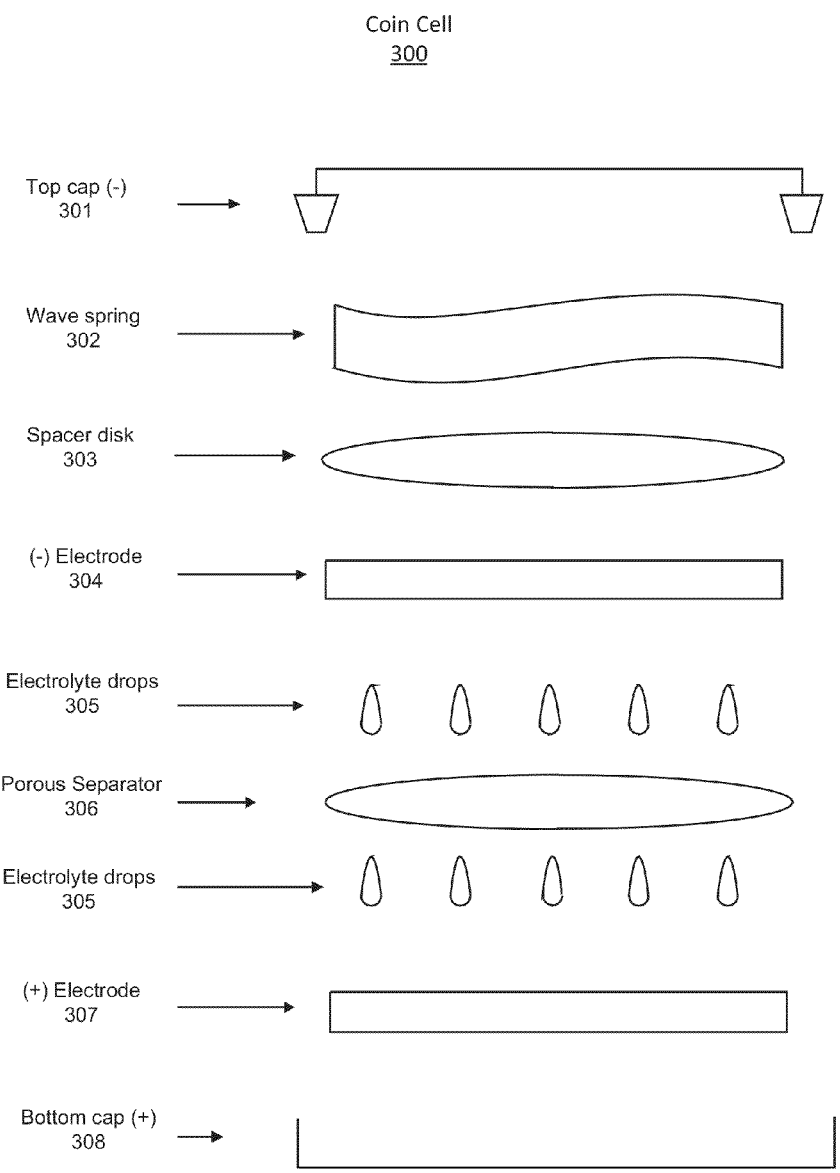
FIG. 3 is a two-dimensional perspective of a Li—S coin cell incorporating a hydrocarbon ionomer article, according to different examples.

Referring to FIG. 3, depicted is a coin cell 300 which is operable as an electrochemical measuring device for testing various configurations and types of hydrocarbon ionomer articles. The function and structure of the coin cell 300 are analogous to those of the cell 100 depicted in FIG. 1. The coin cell 300, like the cell 100, utilizes a lithium-containing electrolyte medium. The lithium-containing electrolyte medium is in contact with the negative electrode and the positive electrode and may be a liquid containing solvent and lithium ion electrolyte.

The lithium ion electrolyte may be non-carbon-containing. For example, the lithium ion electrolyte may be a lithium salt of such counter ions as hexachlorophosphate ($PF_6^-$), perchlorate, chlorate, chlorite, perbromate, bromate, bromite, periodiate, iodate, aluminum fluorides (e.g., $AlF_4^-$), aluminum chlorides (e.g. $Al_2Cl_7^-$, and $AlCl_4^-$), aluminum bromides (e.g., $AlBr_4^-$), nitrate, nitrite, sulfate, sulfites, permanganate, ruthenate, perruthenate and the polyoxometallates.

In another embodiment, the lithium ion electrolyte may be carbon containing. For example, the lithium ion salt may contain organic counter ions such as carbonate, the carboxylates (e.g., formate, acetate, propionate, butyrate, valerate, lactacte, pyruvate, oxalate, malonate, glutarate, adipate, deconoate and the like), the sulfonates (e.g., $CH_3SO_3^-$, $CH_3CH_2SO_3^-$, $CH_3(CH_2)_2SO_3^-$, benzene sulfonate, toluenesulfonate, dodecylbenzene sulfonate and the like. The organic counter ion may include fluorine atoms. For example, the lithium ion electrolyte may be a lithium ion salt of such counter anions as the fluorosulfonates (e.g., $CF_3SO_3^-$, $CF_3CF_2SO_3$—, $CF_3(CF_2)_2SO_3^-$, $CHF_2CF_2SO_3^-$ and the like), the fluoroalkoxides (e.g., $CF_3O$—, $CF_3CH_2O^-$, $CF_3CF_2O^-$ and pentafluorophenolate), the fluoro carboxylates (e.g. trifluoroacetate and pentafluoropropionate) and fluorosulfonimides (e.g., $(CF_3SO_2)_2N^-$). Other electrolytes which are suitable for use herein are disclosed in U.S. Published Patent Applications 2010/0035162 and 2011/00052998 both of which are incorporated herein by reference in their entireties.

The electrolyte medium may exclude a protic solvent, since protic liquids are generally reactive with the lithium anode. Solvents are preferable which may dissolve the electrolyte salt. For instance, the solvent may include an organic solvent such as polycarbonate, an ether or mixtures thereof. In other embodiments, the electrolyte medium may include a non-polar liquid. Some examples of non-polar liquids include the liquid hydrocarbons, such as pentane, hexane and the like.

Electrolyte preparations suitable for use in the cell solution may include one or more electrolyte salts in a nonaqueous electrolyte composition. Suitable electrolyte salts include without limitation: lithium hexafluorophosphate, Li $PF_3$ $(CF_2CF_3)_3$, lithium bis(trifluoromethanesulfonyl)imide, lithium bis(perfluoroethanesulfonyl)imide, lithium (fluorosulfonyl) (nonafluoro-butanesulfonyl)imide, lithium bis(fluorosulfonyl)imide, lithium tetrafluoroborate, lithium perchlorate, lithium hexafluoroarsenate, lithium trifluoromethanesulfonate, lithium tris(trifluoromethanesulfonyl)methide, lithium bis(oxalato)borate, lithium difluoro(oxalato)borate, $Li_2B_{12}F_{12-x}H_x$ where x is equal to 0 to 8, and mixtures of lithium fluoride and anion receptors such as $B(OC_6F_5)_3$. Mixtures of two or more of these or comparable electrolyte salts can also be used. In one embodiment, the electrolyte salt is lithium bis(trifluoromethanesulfonyl) imide). The electrolyte salt may be present in the nonaqueous electrolyte composition in an amount of about 0.2 to about 2.0 M, more particularly about 0.3 to about 1.5 M, and more particularly about 0.5 to about 1.2 M.

EXAMPLES

The following examples demonstrate sample cells with porous separators coated with hydrocarbon ionomer as porous separator 306 of coin cell 300. Comparative examples A and B demonstrate cells without any articles incorporating hydrocarbon ionomer. Reference is made to the specific examples below.

Example 1

Example 1 describes the preparation and electrochemical evaluation of a Li—S cell incorporating a porous separator coated with hydrocarbon ionomer which is a lithium exchanged derivative of SURLYN®, a copolymer of ethylene and methacrylate partially neutralized with zinc, sodium, lithium or other metals. The porous separator was coated by spraying it with SURLYN® and the coated porous separator was immersed in a bath containing a lithium ion source for lithium exchange to increase the lithium neutralization in the SURLYN®.

Preparation of C—S Composite:

Approximately 1.0 g of carbon powder (KETJENBLACK EC-600JD, Akzo Nobel) having a surface area of approximately 1400 $m^2/g$ BET (Product Data Sheet for KETJENBLACK EC-600JD, Akzo Nobel) and a pore volume of 4.07 cc/g (as measured by the BJH method) was placed in a 30 ml glass vial and loaded into an autoclave which was charged with approximately 100 grams of elemental sulfur (Sigma Aldrich 84683). The carbon powder was prevented from being in physical contact with the elemental sulfur but the carbon powder had access to sulfur vapor. The autoclave was closed, purged with nitrogen, and then heated to 300° C. for 24 hours under a static atmosphere to develop sulfur vapor. The final sulfur content of the C—S composite was 51 wt. % sulfur.

Jar Milling of C—S Composite:

1.52 g of the C—S composite described above, 43.2 g of ethanol (Sigma Aldrich 459836) and 125 g of 5 mm diameter zirconia media were weighed into a 125 mL polyethylene bottle. The bottle was sealed, and tumbled end-over-end inside a larger jar on jar mill for 15 hours.

Preparation of Electrode Composition (C—S Composite/Binder/Carbon Black Formulation):

Polyethylene oxide with average $M_w$ of 600,000 (Sigma Aldrich 182028) was dissolved in acetonitrile (Sigma Aldrich 271004) to produce a 5.0 wt. % polymer solution. 121 mg of conductive carbon black SUPER C65 (Timcal Ltd.) (BET nitrogen surface area of 62 $m^2/g$ measured by ASTM D3037-89) (Technical Data Sheet for SUPER C65, Timcal Ltd.) was dispersed in 3.65 g of the 5.0 wt. % PEO solution, 6.8 g of deionized water and 2 g of ethanol. The slurry was mixed with a magnetic stir bar for 15 minutes to form a SUPER C65/PEO slurry. 36 g of the jar milled suspension of C—S composite described above was added to the SUPER C65/PIB slurry along with 24 g of deionized water. The solid loading in this mixture has an approximate % PEO in the PEO & C—S of 0.1304 (i.e., 13.04% by weight PEO). This formulation was stirred for 90 minutes, then mixed for 30 minutes in an ultrasonic bath, and stirred again for 60 minutes.

Spray Coating to Form Layering/Electrode:

A layering/electrode was formed by spraying the formulated ink slurry mixture onto one side of double-sided carbon coated aluminum foil (1 mil, Exopac Advanced Coatings) as a substrate for the layering/electrode. The dimensions of the coated area on the substrate was approximately 10 cm×10 cm. The ink slurry mixture was sprayed through an air brush (PATRIOT 105, Badger Air-Brush Co.) onto the substrate in a layer by layer pattern. The substrate was heated on a 70° C. hotplate for about 10 seconds following the application of every 4 layers to the substrate surface. Once all of the ink slurry mixture was sprayed onto the substrate, the layering/electrode was placed in a vacuum at a temperature of 70° C. for a period of 5 minutes. The dried layering/electrode was calendared between two steel rollers on a custom built device to a final thickness of about 1 mil.

Preparation of Hydrocarbon Ionomer (SURLYN®) Coated Porous Separator:

A piece of CELGARD 2325 separator (Celgard, LLC) with dimensions 6 cm by 11.6 cm was taped to a glass plate and heated to 70° C. on a hot plate. The separator was then sprayed, using the air brush, with an aqueous dispersion of SURLYN® ionomer, 6.4 wt. % loading. When the Surlyn® loading on the separator reached 0.3 mg per $cm^2$, the sample was dried in a vacuum oven at 70° C. for 15 minutes. The coated separator was then ion exchanged by immersing it in a bath of aqueous 2M LiOH solution overnight. It was rinsed with deionized water and dried under vacuum at 70° C. for 2 hours.

Preparation of Electrolyte:

2.87 grams of lithium bis(trifluoro-methane sulfonyl)imide (LiTFSI, Novolyte) was combined with 10 milliliters of 1,2 dimethoxyethane (glyme, Sigma Aldrich, 259527) to create a 0.9 M electrolyte solution.

Preparation of Coin Cell:

A 14.29 mm diameter circular disk was punched from the layering/electrode and used as the positive electrode 307. The final weight of the electrode (14.29 mm in diameter, subtracting the weight of the aluminum current collector) was 4.3 mg. This corresponds to a calculated weight of 1.76 mg of elemental sulfur on the electrode.

The coin cell 300 included the positive electrode 307, a 19 mm diameter circular disk was punched from Surlyn®-coated separator sheet described in the previous section. This disk was soaked overnight in glyme (Sigma Aldrich, 259527). The soaked disk was used as the porous separator 306 in the coin cell 300 with the coated side of the separator facing the positive electrode. The positive electrode 307, the separator 306, a lithium foil negative electrode 304 (Chemetall Foote Corp.) and a few electrolyte drops 305 of the nonaqueous electrolyte was sandwiched in a Hohsen 2032 stainless steel coin cell can with a 1 mil thick stainless steel spacer disk and wave spring (Hohsen Corp.). The construction involved the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly was crimped with an MTI crimper (MTI).

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 827 mAh/g S with a coulombic efficiency of 80.2%.

Example 2

The materials in example 2 were prepared as identical to those in example 1, except the hydrocarbon ionomer coated porous separator was calendared at a higher temperature before the cell was assembled.

Preparation of Hydrocarbon Ionomer (SURLYN®) Coated Porous Separator:

A strip of the lithium ion exchanged SURLYN® coated separator, 6 cm×3 cm, was cut from the separator in Example 1 and calendared between two steel rollers on a custom-built calendaring device. The separator was sandwiched between pieces of KAPTON® film. The temperature of the rollers was maintained at 70° C.

Preparation of Coin Cell:

A coin cell and electrolyte were prepared and cycled using the same procedures as example 1. The final weight of the electrode (14.29 mm in diameter, subtracting the weight of the aluminum current collector) was 4.1 mg. This corresponds to a calculated weight of 1.68 mg of elemental sulfur on the electrode.

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 855 mAh/g S with a coulombic efficiency of 90%.

Comparative Example A

Comparative example A describes the preparation and electrochemical evaluation of a Li—S cell with a porous separator not coated with any hydrocarbon ionomer for comparison with examples 1 and 2 above. The Li—S cell in comparative example A utilizes a porous separator that is not coated with any hydrocarbon ionomer or calendared at any temperature, but was otherwise prepared in a manner similar to the preparation described in examples 1 and 2 above.

Preparation of Coin Cell:

A coin cell was prepared and cycled using the same procedures as examples 1 and 2. The positive electrode 307 used in comparative example A was identical to the electrodes in examples 1 and 2. The final weight of the electrode (14.29 mm in diameter, subtracting the weight of the aluminum current collector) was 4.8 mg. This corresponds to a calculated weight of 2.0 mg of sulfur on the electrode. The porous separator was made from CELGARD 2325, which was used as received. The porous separator was not soaked in glyme prior to assembling the coin cell.

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 1,056 mAh/g S with a coulombic efficiency of 51.3%.

Example 3

Example 3 describes the preparation and electrochemical evaluation of a Li—S cell including a porous separator coated with a hydrocarbon ionomer that is a lithium exchanged derivative of a sodium salt of polyvinyl sulfonic acid (PVSA) (Sigma Aldrich, 278424).

Preparation of C—S Composite:

Approximately 1.0 g of carbon powder (KETJENBLACK EC-600JD, Akzo Nobel) having a surface area of approximately 1400 m$^2$/g BET (Product Data Sheet for KETJENBLACK EC-600JD, Akzo Nobel) and a pore volume of 4.07 cc/g (as measured by the BJH method) was placed in a 30 ml glass vial and loaded into an autoclave which was charged with approximately 100 grams of elemental sulfur (Sigma Aldrich 84683). The carbon powder was prevented from being in physical contact with the elemental sulfur but the carbon powder had access to sulfur vapor. The autoclave was closed, purged with nitrogen, and then heated to 300° C. for 24 hours under a static atmosphere to develop sulfur vapor. The final sulfur content of the C—S composite was 51 wt. % sulfur.

Jar Milling of C—S Composite:

1.8 g of the C—S composite described above, 51 g of toluene (EMD Chemicals) and 120 g of 5 mm diameter zirconia media was weighted into a 125 mL polyethylene bottle. The bottle was sealed, and tumbled end-over-end inside a larger jar on jar mill for 15 hours.

Preparation of Base Composition (C—S Composite/Binder/Carbon Black Formulation):

Polyisobutylene with average M$_w$ of 4,200,000 (Sigma Aldrich 181498) was dissolved in toluene to produce a 2.0 wt. % polymer solution. 153 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) was dispersed in 11.4 g of the 2.0 wt. % PIB solution. 45 g of the jar milled suspension of C—S composite described above was added to the SUPER C65/PIB slurry along with 27 g of toluene to form an ink slurry with about 2 wt. % solid loading. This ink was stirred for 3 hours.

Spray Coating to Form Layering/Electrode:

A layering/electrode was formed by spraying the formulated ink slurry onto one side of double-sided carbon coated aluminum foil (1 mil, Exopac Advanced Coatings) as a substrate for the base layering/electrode. The dimensions of the coated area on the substrate was approximately 10 cm×10 cm. The ink slurry was sprayed through an air brush (PATRIOT 105, Badger Air-Brush Co.) onto the substrate in a layer by layer pattern. The substrate was heated on a 70° C. hotplate for about 10 seconds following the application of every 4 layers to the substrate surface. Once all of the ink slurry was sprayed onto the substrate, the base layering/electrode was placed in a vacuum at a temperature of 70° C. for a period of 5 minutes.

Preparation of Hydrocarbon Ionomer (PVSA) Solution:

A 25 wt. % dispersion of polyvinylsulfonic acid (PVSA) sodium salt (Sigma Aldrich, 278424) was passed through a column of DOWEX® (Dow 50WX8-200) ion exchange resin which had been exchanged with lithium ions. The polymer concentration in the eluate solution was 2.5 wt. %.

Hydrocarbon Ionomer (PVSA) Spray Coating of Porous Separator:

A piece of CELGARD 2325 separator (Celgard, LLC) with dimensions 6 cm by 9 cm was taped to a glass plate and heated to 70° C. on a hot plate. The porous separator was then sprayed using the air brush with the PVSA solution prepared in the previous section. When the PVSA loading on the separator reached about 0.7 mg per square cm, the sample was dried in a vacuum oven at 70° C. overnight. The coated separator was transferred to a nitrogen dry box.

Preparation of Electrolyte:

2.87 grams of lithium bis(trifluoro-methane sulfonyl)imide (LiTFSI, Novolyte) was combined with 10 milliliters of 1,2 dimethoxyethane (glyme, Sigma Aldrich, 259527) to create a 0.9 M electrolyte solution.

Preparation of Coin Cell:

A coin cell 300 was prepared using electrode and the coated porous separator described above for testing. A 14.29 mm diameter circular disk was punched from the final layering/electrode and used as the positive electrode 307. The final weight of the electrode (14.29 mm in diameter, subtracting the weight of the aluminum current collector) was 5.7 mg. This corresponds to a calculated weight of 2.34 mg of elemental sulfur on the electrode.

A 19 mm diameter circular disk was punched from the PVSA-coated separator sheet described in the previous section. This disk was soaked overnight in glyme (Sigma Aldrich, 259527). It was then used as the porous separator 306 in the coin cell 300 with the coated side of the separator facing the positive electrode 307.

The positive electrode 307, the separator 306, a lithium foil negative electrode 304 (Chemetall Foote Corp.) and a few electrolyte drops 305 of the nonaqueous electrolyte were sandwiched in a Hohsen 2032 stainless steel coin cell can with a 1 mil thick stainless steel spacer disk and wave spring (Hohsen Corp.). The construction involved the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly was crimped with an MTI crimper (MTI).

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 1,002 mAh/g S with a coulombic efficiency of 83.6%.

Example 4

Example 4 describes the preparation and electrochemical evaluation of a Li—S cell including a porous separator coated with hydrocarbon ionomer which was a lithium exchanged sulfonated derivative (SPEEK) of a poly(ether ether-ketone) PEEK (Victrex, 150P). The positive electrode in this example was identical to the electrode used in example 3. The separator in this example was coated with sulfonated poly(ether ether ketone) (SPEEK) ionomer instead of PVSA.

Sulfonation of PEEK with Lithium Ion Exchange Forming SPEEK:

5.0 g of PEEK (Victrex, 150P, Lancashire, UK) was dissolved in 176 g of concentrated sulfuric acid, and stirred rapidly for six days at room temperature. The polymer was precipitated from solution in ice water, then filtered and rinsed with deionized water until the filtrate pH reached 4. The polymer was exchanged with lithium ions by stirring in a bath of 2 M lithium hydroxide. The solution was filtered and the polymer was rinsed with deionized water until the filtrate was pH neutral. Finally the polymer was dried in a 70° C. vacuum oven overnight.

Hydrocarbon Ionomer (SPEEK) Spray Coating of Porous Separator:

Lithium-exchanged SPEEK was dissolved in dimethylacetimide (DMAc) (Sigma Aldrich, 271012) at a 5 wt. % concentration. A piece of CELGARD 2325 porous separator (Celgard, LLC) with dimensions 6 cm by 6 cm was taped to glass plate and heated to 70° C. on a hot plate. The porous separator was then spray coated, using the air brush, with the lithium-exchanged SPEEK solution. When the ionomer loading on the separator reached about 0.2 mg per square cm, the sample was transferred to a 70° C. vacuum oven for 8 hours. The coated separator was transferred to a nitrogen dry box.

Preparation of Electrolyte:

2.87 grams of lithium bis(trifluoro-methane sulfonyl)imide (LiTFSI, Novolyte) is combined with 10 milliliters of 1,2 dimethoxyethane (glyme, Sigma Aldrich, 259527) to create a 0.9 M electrolyte solution.

Preparation of Coin Cell:

Coin cells were prepared and cycled using the same procedures as example 1. The final weight of the electrode (14.29 mm in diameter, subtracting the weight of the aluminum current collector) was 4.9 mg. This corresponds to a calculated weight of 2.01 mg of sulfur on the electrode.

Electrochemical Testing Conditions:

The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 945 mAh/g S with a coulombic efficiency of 92.3%.

Comparative Example B

Comparative example B describes the preparation and electrochemical evaluation of a Li—S cell with a porous separator not coated with any hydrocarbon ionomer for comparison with examples 3 and 4 above. The Li—S cell in comparative example B utilizes a porous separator that is not coated with any hydrocarbon ionomer.

Preparation of Coin Cell:

A coin cell was prepared and cycled using the same procedures as examples 3 and 4. The positive electrode 307 used in comparative example B was identical to the electrode in examples 3 and 4. The final weight of the electrode (14.29 mm in diameter, subtracting the weight of the aluminum current collector) was 5.2 mg. This corresponds to a calculated weight of 2.09 mg of sulfur on the electrode. The porous separator was made from CELGARD 2325, which was used as received. The porous separator was not soaked in glyme prior to assembling the coin cell.

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 1,023 mAh/g S with a coulombic efficiency of 56.5%.

Example 5

Example 5 describes the preparation and electrochemical evaluation of a Li—S cell incorporating a porous separator coated with hydrocarbon ionomer which is a lithium exchanged derivative of SURLYN®, a copolymer of ethylene and methacrylate partially neutralized with zinc, sodium, lithium or other metals. The porous separator was coated by spraying it with SURLYN® and the coated porous separator was immersed in a bath containing a lithium ion source for lithium exchange to increase the lithium neutralization in the SURLYN®.

Preparation of C—S Composite:

Approximately 1.0 g of carbon powder (KETJENBLACK EC-600JD, Akzo Nobel) having a surface area of approximately 1400 m2/g BET (Product Data Sheet for KETJENBLACK EC-600JD, Akzo Nobel) and a pore volume of 4.07 cc/g (as measured by the BJH method) was placed in a 30 ml glass vial and loaded into an autoclave which was charged with approximately 100 grams of elemental sulfur (Sigma Aldrich 84683). The carbon powder was prevented from being in physical contact with the elemental sulfur but the carbon powder had access to sulfur vapor. The autoclave was closed, purged with nitrogen, and then heated to 300° C. for 24 hours under a static atmosphere to develop sulfur vapor. The final sulfur content of the C—S composite was 53.3 wt. % sulfur.

Jar Milling of C—S Composite:

1.85 g of the C—S composite described above, 53.15 g of toluene (EMD Chemicals) and 115 g of 5 mm diameter zirconia media were weighed into a 125 mL polyethylene bottle. The bottle was sealed, and tumbled end-over-end inside a larger jar on jar mill for 15 hours.

Preparation of (80/12/8) Electrode Composition (C—S Composite/Binder/Carbon Black Formulation):

Polyisobutylene with average Mw of 4,200,000 (Sigma Aldrich 1814980 was dissolved in toluene to produce a 2.0 wt. % polymer solution. 290 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) was dispersed in 21.65 g of the 2.0 wt. % PIB solution along with 21 g of toluene. The slurry was mixed with a magnetic stir bar for 5 minutes to form a SUPER C65/PIB slurry. 2.912 g of the jar milled suspension of C—S composite described above was added to the SUPER C65/PIB slurry along with an additional 44 g of toluene. This ink, with a 2.10 wt. % solid loading, was stirred for 3 hours.

Spray Coating to Form Layering/Electrode:

A layering/electrode was formed by spraying the formulated ink slurry mixture onto one side of double-sided carbon coated aluminum foil (1 mil, Exopac Advanced Coatings) as a substrate for the layering/electrode. The dimensions of the coated area on the substrate was approximately 5 cm×5 cm. The ink slurry mixture was sprayed through an air brush (PATRIOT 105, Badger Air-Brush Co.) onto the substrate in a layer by layer pattern. The substrate was heated on a 70° C. hotplate for about 10 seconds following the application of every 4 layers to the substrate surface. Once all of the ink slurry mixture was sprayed onto the substrate, the layering/electrode was placed in a vacuum at a temperature of 70° C. for a period of 5 minutes. The dried layering/electrode was calendared between two steel rollers on a custom built device to a final thickness of about 1 mil.

Preparation of Hydrocarbon Ionomer (SURLYN®) Coated

Energain® Polyimide Battery Separator: A piece of Energain® Polyimide Battery Separator (DuPont Company) with dimensions 10.7 cm by 6.7 cm was taped to a glass plate and heated to 70° C. on a hot plate. The separator was then sprayed, using the air brush, with an aqueous dispersion of SURLYN® ionomer, 6.4 wt. % loading. When the Surlyn® loading on the separator reached 0.4 mg per cm$^2$, the sample was dried in a vacuum oven at 70° C. for 15 minutes. The coated separator was then ion exchanged by immersing it in a bath of aqueous 2M LiOH solution overnight. It was rinsed with deionized water and dried under vacuum at 70° C. for 2 hours. After drying overnight at 70 C, a 2.25"×2.15" piece of the Surlyn®/Energain® composite was hot pressed on a Carver hydraulic press. The hydraulic press was preheated to 70 C. The composite was sandwiched between two PFA (perfluoroalkyl) sheets and then sandwiched between two pieces of 4"×4" glass plate. 1000 pounds force was applied for 10 minutes to create the final composite structure.

Scanning electron micrographs of the polymer composite were obtained by first cutting approximately 0.5 cm×1.0 cm section film and mounting it on sticky carbon tape on an Si wafer. The mounted films were coated with 2 nm Os metal using the OPC-80 Osmium Plasma Coater. The films were examined in the Hitachi S4000 FE-SEM at 2.5 keV accelerating voltage at a 10 mm working distance. Images were taken at very low magnifications (100×) to moderately high magnification (10,000×) to compare surface features.

Preparation of Electrolyte:

3.59 grams of lithium bis(trifluoro-methane sulfonyl)imide (LiTFSI, Novolyte) was combined with 20.32 grams (23.40 ml) of 1,2 dimethoxyethane (glyme, Sigma Aldrich, 259527) to create a 0.5 M electrolyte solution.

Preparation of Coin Cell:

A 14.29 mm diameter circular disk was punched from the layering/electrode and used as the positive electrode 307. The final weight of the electrode (14.29 mm in diameter, subtracting the weight of the aluminum current collector) was 4.71 mg. This corresponds to a calculated weight of 2.01 mg of elemental sulfur on the electrode.

The coin cell 300 includes the positive electrode 307, the 19 mm diameter circular disk punched from the Surlyn®/Energain® composite described in the previous section and two 19 mm piece of Celgard 2500 polyolefin separator (Celgard, LLC). The two Celgard 2500 diskes were used to sandwich the Surlyn®/Energain® compous, and were used together as the final separator 306 in the coin cell 300 with the lithium exchanged The Surlyn®/Energain® composite was assembled so the "Surlyn" side of the separator faced the positive electrode. The positive electrode 307, the separator 306, a lithium foil negative electrode 304 (3 mils thickness, Chemetall Foote Corp.) and a few electrolyte drops 305 of the nonaqueous electrolyte was sandwiched in a MTI stainless steel coin cell can with a 1 mil thick stainless steel spacer disk and wave spring (Hohsen Corp.). The construction involved the following sequence as shown in FIG. 3: bottom cap 308, positive electrode 307, electrolyte drops 305, separator 306, electrolyte drops 305, negative electrode 304, spacer disk 303, wave spring 302 and top cap 301. The final assembly was crimped with an MTI crimper (MTI).

Electrochemical Testing Conditions:

The positive electrode 307 was cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum charge capacity measured on discharge at cycle 10 was 1013 mAh/g S with a coulombic efficiency of 90%.

Utilizing a Li—S cell incorporating hydrocarbon ionomer articles, such as coatings, membranes, films and other articles incorporating hydrocarbon ionomer provides a high maximum charge capacity Li—S battery with high coulombic efficiency. Li—S cells incorporating hydrocarbon ionomer articles may be utilized in a broad range of Li—S battery applications in providing a source of potential power for many household and industrial applications. The Li—S batteries incorporating these hydrocarbon ionomer articles are especially useful as power sources for small electrical devices such as cellular phones, cameras and portable computing devices and may also be used as power sources for car ignition batteries and for electrified cars.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

Further, the purpose of the foregoing Abstract is to enable the U.S. Patent and Trademark Office and the public generally and especially the scientists, engineers and practitioners in the relevant art who are not familiar with patent or legal terms or phraseology, to determine quickly from a cursory inspection the nature and essence of this technical disclosure. The Abstract is not intended to be limiting as to the scope of the present invention in any way.

What is claimed is:

1. A cell, comprising:
   a positive electrode comprising sulfur compound;
   a negative electrode;
   a circuit coupling the positive electrode with the negative electrode;
   an electrolyte medium;
   an interior wall of the cell; and
   an article comprising a hydrocarbon ionomer;
   wherein the sulfur compound is elemental sulfur, a lithiated sulfur compound, a disulfide compound, or a polysulfide compound, or a combination thereof.

2. The cell of claim 1, wherein the article is a porous separator comprising at least one of polyimide, polyethylene and polypropylene.

3. The cell of claim 1, wherein the hydrocarbon ionomer is incorporated as a surface coating on a surface of the article in an amount of about 0.0001 to 100 mg/cm$^2$.

4. The cell of claim 2, wherein the hydrocarbon ionomer is located in a pore wall of a pore in the porous separator and exposed to electrolyte medium in a pore volume in the pore.

5. The cell of claim 1, wherein the electrolyte medium is a lithium-containing cell solution comprising solvent and electrolyte.

6. The cell of claim 1, wherein the article is a coating located on a surface of at least one of
   a porous separator,
   the negative electrode,
   the circuit, and
   the interior wall of the cell.

7. The cell of claim 1, wherein the hydrocarbon ionomer comprises at least one ionic group selected from carboxylate ionic groups.

8. The cell of claim 1, wherein the hydrocarbon ionomer is a random copolymer of poly(ethylene-co-(meth)acrylic) acid, and
   wherein the copolymer is at least partially neutralized and comprises (meth)acrylic acid comonomer that is one of acrylic acid comonomer,
   methacrylic acid comonomer, and
   a combination of acrylic acid and methacrylic acid comonomers.

9. A method for making a cell, comprising:
   fabricating a plurality of components to form the cell, wherein the plurality comprises
   a positive electrode comprising sulfur compound,
   a negative electrode,
   a circuit coupling the positive electrode with the negative electrode,
   an electrolyte medium,
   an interior wall of the cell, and
   an article comprising a hydrocarbon ionomer;
   wherein the sulfur compound is elemental sulfur, a lithiated sulfur compound, a disulfide compound, or a polysulfide compound, or a combination thereof.

10. The method of claim 9, wherein the article is a porous separator comprising at least one of polyimide, polyethylene and polypropylene.

11. The method of claim 9, wherein the hydrocarbon ionomer comprises at least one ionic group selected from carboxylate ionic groups.

12. A method for using a cell, comprising at least one step from the plurality of steps comprising
   converting chemical energy stored in the cell into electrical energy; and
   converting electrical energy into chemical energy stored in the cell, wherein the cell comprises
   a positive electrode comprising sulfur compound,
   a negative electrode,
   a circuit coupling the positive electrode with the negative electrode,
   an electrolyte medium,
   an interior wall of the cell, and
   an article comprising hydrocarbon ionomer;

wherein the sulfur compound is elemental sulfur, a lithiated sulfur compound, a disulfide compound, or a polysulfide compound, or a combination thereof.

13. The method of claim 12, wherein the cell is associated with at least one of a portable battery, a power source for an electrified vehicle, a power source for an ignition system of a vehicle and a power source for a mobile device.

14. The method of claim 12, wherein the article is a porous separator comprising at least one of polyimide, polyethylene and polypropylene.

15. The method of claim 12, wherein the hydrocarbon ionomer comprises at least one ionic group selected from carboxylate ionic groups.

16. The cell of claim 1, wherein the hydrocarbon ionomer comprises at least one ionic group selected from sulfonate, phosphate, and phosphonate ionic groups.

17. The cell of claim 1, wherein the hydrocarbon ionomer is one of
   a neutralized polyvinyl sulfonic acid, and
   a neutralized sulfonated derivative of a poly(ether etherketone).

18. The cell of claim 1, wherein the hydrocarbon ionomer has a neutralization ratio of greater than about 10%.

19. The method of claim 9, wherein the hydrocarbon ionomer comprises at least one ionic group selected from sulfonate, phosphate, and phosphonate ionic groups.

20. The method of claim 12, wherein the hydrocarbon ionomer comprises at least one ionic group selected from sulfonate, phosphate, and phosphonate ionic groups.

* * * * *